United States Patent
Venkataramani et al.

(10) Patent No.: US 10,078,717 B1
(45) Date of Patent: Sep. 18, 2018

(54) SYSTEMS AND METHODS FOR ESTIMATING PERFORMANCE CHARACTERISTICS OF HARDWARE IMPLEMENTATIONS OF EXECUTABLE MODELS

(71) Applicant: The MathWorks, Inc., Natick, MA (US)

(72) Inventors: Girish Venkataramani, Boston, MA (US); Yongfeng Gu, Brookline, MA (US); Rama Kokku, Natick, MA (US)

(73) Assignee: The MathWorks, Inc., Natick, MA (US)

(*) Notice: Subject to any disclaimer, the term of this patent is extended or adjusted under 35 U.S.C. 154(b) by 0 days.

(21) Appl. No.: 14/562,647

(22) Filed: Dec. 5, 2014

Related U.S. Application Data

(60) Provisional application No. 61/912,214, filed on Dec. 5, 2013.

(51) Int. Cl.
*G06F 17/50* (2006.01)

(52) U.S. Cl.
CPC ........ *G06F 17/505* (2013.01); *G06F 17/5031* (2013.01); *G06F 17/5081* (2013.01);
(Continued)

(58) Field of Classification Search
CPC .............. G06F 17/505; G06F 17/5031; G06F 17/5081; G06F 2217/07; G06F 2217/79;
(Continued)

(56) References Cited

U.S. PATENT DOCUMENTS 5,164,724 A 11/1992 Hartley et al.
5,426,591 A 6/1995 Ginetti
(Continued)

FOREIGN PATENT DOCUMENTS

| EP | 1387260 A1 | * | 2/2004 | .............. G06F 8/10 |
| EP | 1387260 A1 |   | 2/2004 | |
| JP | 2008140061 A | * | 6/2008 | |

OTHER PUBLICATIONS

Gu, Yongfeng, "Systems and Methods for Generating Optimized Hardware Descriptions for Models", U.S. Appl. No. 14/562,382, filed Dec. 5, 2014, pp. 1-51.
(Continued)

*Primary Examiner* — Phallaka Kik
(74) *Attorney, Agent, or Firm* — Cesari and McKenna, LLP.; Michael R. Reinemann

(57) ABSTRACT

Systems and methods automatically generate optimized hardware description language code for a model created in a modeling environment. A training tool selects and provides scripts to a hardware synthesis tool chain that direct the tool chain to synthesize hardware components for core components of the modeling environment. A report generated by the tool chain is evaluated to extract performance data for the core components, and the performance data is stored in a library. An optimization tool estimates the performance of the model using the performance data in the library. Based on the performance estimate and an analysis of the model, the optimization tool selects an optimization technique which it applies to the model generating a revised. Estimating performance, and selecting and applying optimizations may be repeated until a performance constraint is satisfied or a termination criterion is met.

35 Claims, 13 Drawing Sheets

(52) U.S. Cl.
CPC ...... *G06F 2217/80* (2013.01); *G06F 2217/82* (2013.01); *G06F 2217/84* (2013.01)

(58) Field of Classification Search
CPC ............. G06F 2217/80; G06F 2217/82; G06F 2217/84
USPC ........ 716/104, 103, 106, 108, 109, 111, 113, 716/131, 133, 134, 135, 136, 117; 703/16
See application file for complete search history.

(56) References Cited

U.S. PATENT DOCUMENTS

| | | | |
|---|---|---|---|
| 5,544,067 A | 8/1996 | Rostoker | |
| 5,553,002 A | 9/1996 | Dangelo | |
| 5,555,201 A | 9/1996 | Dangelo et al. | |
| 5,586,325 A | 12/1996 | MacDonald et al. | |
| 5,655,109 A * | 8/1997 | Hamid | G06F 17/5036 716/103 |
| 5,701,294 A | 12/1997 | Ward et al. | |
| 5,726,902 A * | 3/1998 | Mahmood | G06F 17/5045 716/102 |
| 5,764,525 A * | 6/1998 | Mahmood | G06F 17/5045 716/104 |
| 5,764,951 A | 6/1998 | Ly et al. | |
| 5,920,711 A | 7/1999 | Seawright et al. | |
| 5,923,653 A | 7/1999 | Denton | |
| 5,956,674 A | 9/1999 | Smyth et al. | |
| 6,118,902 A | 9/2000 | Knowles | |
| 6,128,025 A | 10/2000 | Bright et al. | |
| 6,173,438 B1 | 1/2001 | Kodosky et al. | |
| 6,216,252 B1 | 4/2001 | Dangelo et al. | |
| 6,282,699 B1 | 8/2001 | Zhang et al. | |
| 6,363,515 B1 | 3/2002 | Rajgopal | |
| 6,363,520 B1 | 3/2002 | Boubezari | |
| 6,389,579 B1 * | 5/2002 | Phillips | G06F 17/5022 716/115 |
| 6,397,170 B1 | 5/2002 | Dean | |
| 6,437,805 B1 | 8/2002 | Sojoodi et al. | |
| 6,505,339 B1 | 1/2003 | Miller et al. | |
| 6,526,562 B1 * | 2/2003 | Haddad | G06F 17/5045 716/104 |
| 6,584,601 B1 | 6/2003 | Kodosky et al. | |
| 6,651,222 B2 | 11/2003 | Gupta et al. | |
| 6,654,945 B1 * | 11/2003 | Nakayama | G06F 17/5045 716/104 |
| 6,813,597 B1 * | 11/2004 | Demler | G06F 17/5063 703/14 |
| 6,883,147 B1 | 4/2005 | Ballagh et al. | |
| 7,007,254 B1 | 2/2006 | Borkovic | |
| 7,076,415 B1 * | 7/2006 | Demler | G06F 17/505 703/14 |
| 7,103,526 B2 | 9/2006 | Allen et al. | |
| 7,143,368 B1 | 11/2006 | Plofsky et al. | |
| 7,162,710 B1 | 1/2007 | Edwards et al. | |
| 7,178,112 B1 | 2/2007 | Ciolfi et al. | |
| 7,197,743 B2 | 3/2007 | Borg et al. | |
| 7,260,501 B2 | 8/2007 | Pattloati et at. | |
| 7,272,542 B1 | 9/2007 | Sanders | |
| 7,275,026 B2 | 9/2007 | Mani et al. | |
| 7,313,449 B1 | 12/2007 | Clolfi et al. | |
| 7,318,014 B1 | 1/2008 | Molson et al. | |
| 7,331,037 B2 | 2/2008 | Dickey et al. | |
| 7,340,684 B2 | 3/2008 | Ramamoorthy et al. | |
| 7,366,997 B1 | 4/2008 | Rahmat et al. | |
| 7,376,544 B1 | 5/2008 | Dick et al. | |
| 7,503,027 B1 | 3/2009 | Zhao | |
| 7,509,244 B1 | 3/2009 | Shakeri et al. | |
| 7,530,047 B2 * | 5/2009 | Wang | G06F 17/5045 716/109 |
| 7,725,848 B2 * | 5/2010 | Nebel | G06F 17/5022 716/104 |
| 7,788,625 B1 | 8/2010 | Donlin et al. | |
| 7,882,457 B1 | 2/2011 | Plofsky et al. | |
| 7,882,462 B2 | 2/2011 | Ogilvie | |
| 7,900,188 B2 | 3/2011 | Costa et al. | |
| 7,983,879 B1 | 7/2011 | Vetsch et al. | |
| 8,041,551 B1 | 10/2011 | Pakyari | |
| 8,046,386 B2 | 10/2011 | Taitel | |
| 8,082,530 B1 | 12/2011 | Ou et al. | |
| 8,095,899 B1 * | 1/2012 | Dupenloup | G06F 7/53 716/100 |
| 8,201,121 B1 * | 6/2012 | Sankaralingam | G06F 17/5045 716/109 |
| 8,286,112 B2 | 10/2012 | Miranda et al. | |
| 8,359,586 B1 | 1/2013 | Orofino et al. | |
| 8,402,449 B1 | 3/2013 | Biswas | |
| 8,458,630 B1 * | 6/2013 | Van Canpenhout | G06F 17/505 716/103 |
| 8,533,642 B1 | 9/2013 | Ogilvie | |
| 8,533,742 B2 | 9/2013 | Ginis et al. | |
| 8,589,870 B2 | 11/2013 | Ogilvie | |
| 8,694,947 B1 * | 4/2014 | Venkataramani | G06F 17/5045 716/113 |
| 8,745,558 B1 * | 6/2014 | Garofalo | G06F 17/505 716/101 |
| 8,806,403 B1 | 8/2014 | Denisenko | |
| 8,863,069 B1 | 10/2014 | Venkataramani et al. | |
| 8,869,103 B2 | 10/2014 | Conrad et al. | |
| 8,898,049 B2 | 11/2014 | Dhanwada et al. | |
| 8,904,367 B1 | 12/2014 | Biswas | |
| 9,298,862 B1 | 3/2016 | Venkataramani | |
| 9,300,275 B1 * | 3/2016 | Kumar | H03K 3/012 |
| 9,449,132 B2 | 9/2016 | Chen et al. | |
| 2002/0022905 A1 | 2/2002 | Erlanoen et al. | |
| 2002/0080174 A1 | 6/2002 | Kodosky et al. | |
| 2002/0188928 A1 | 12/2002 | Szpak et al. | |
| 2002/0193078 A1 | 12/2002 | MacFarlane Shearer et al. | |
| 2003/0016234 A1 | 1/2003 | Mani et al. | |
| 2003/0215017 A1 | 11/2003 | Fang | |
| 2004/0049596 A1 | 3/2004 | Schuehler et al. | |
| 2004/0088674 A1 * | 5/2004 | Kato | G06F 17/5045 716/102 |
| 2004/0210685 A1 | 10/2004 | Orofino et al. | |
| 2004/0243964 A1 * | 12/2004 | McElvain | G06F 17/5031 716/112 |
| 2005/0055666 A1 | 3/2005 | Kornerup et al. | |
| 2005/0204316 A1 * | 9/2005 | Nebel | G06F 17/5022 716/103 |
| 2006/0057594 A1 * | 3/2006 | Wang | G06F 17/505 435/6.11 |
| 2006/0064670 A1 | 3/2006 | Linebarger et al. | |
| 2006/0080076 A1 | 4/2006 | Lahiri et al. | |
| 2006/0095871 A1 * | 5/2006 | Levy | G06F 17/5036 716/103 |
| 2006/0190851 A1 | 8/2006 | Karaki | |
| 2006/0225021 A1 | 10/2006 | Padalia et al. | |
| 2006/0294491 A1 * | 12/2006 | Becker | G06F 17/505 716/104 |
| 2007/0058572 A1 | 3/2007 | Clauberg | |
| 2007/0083831 A1 * | 4/2007 | Hamilton | G06F 17/5045 716/105 |
| 2007/0113209 A1 | 5/2007 | Park et al. | |
| 2007/0261040 A1 | 11/2007 | Ogilvie et al. | |
| 2007/0277161 A1 | 11/2007 | Herbordt et al. | |
| 2008/0066046 A1 | 3/2008 | Ogilvie | |
| 2008/0098349 A1 | 4/2008 | Lin et al. | |
| 2008/0189089 A1 | 8/2008 | Lee | |
| 2008/0234995 A1 | 9/2008 | Newcomb et al. | |
| 2009/0002371 A1 | 1/2009 | Linebarger et al. | |
| 2009/0031278 A1 | 1/2009 | McElvain | |
| 2009/0144673 A1 * | 6/2009 | Goodnow | G06F 17/505 716/132 |
| 2009/0150857 A1 * | 6/2009 | Srinivasan | G01R 31/318357 717/104 |
| 2009/0183127 A1 | 7/2009 | Bell | |
| 2009/0254525 A1 * | 10/2009 | Srinivasan | G06F 17/3056 |
| 2010/0050135 A1 * | 2/2010 | Aleksanyan | G11C 29/812 716/132 |
| 2010/0058272 A1 | 3/2010 | Bowers | |
| 2010/0131934 A1 | 5/2010 | Kim | |

(56) References Cited

U.S. PATENT DOCUMENTS

| | | |
|---|---|---|
| 2010/0241620 A1 | 9/2010 | Manister et al. |
| 2011/0035203 A1 | 2/2011 | Dalton et al. |
| 2011/0041106 A1 | 2/2011 | Li |
| 2012/0030646 A1* | 2/2012 | Ravindran ............... G06F 8/34 717/105 |
| 2012/0072876 A1* | 3/2012 | Salz ..................... G06F 17/504 716/102 |
| 2012/0124552 A1 | 5/2012 | Lin et al. |
| 2012/0274357 A1* | 11/2012 | Klass .............. H03K 19/00307 326/102 |
| 2013/0139119 A1 | 5/2013 | Hidvegi et al. |
| 2013/0147547 A1* | 6/2013 | Nalawade ........... G06F 17/5063 327/551 |
| 2013/0212365 A1 | 8/2013 | Chen |
| 2013/0212366 A1 | 8/2013 | Chen |
| 2014/0157218 A1 | 6/2014 | Gu |
| 2015/0178418 A1 | 6/2015 | Gu |

OTHER PUBLICATIONS

Gu, Yongfeng, "Systems and Methods for Tracing Performance Information From Hardware Realizations to Models", U.S. Appl. No. 14/562,356, filed Dec. 5, 2014, pp. 1-57.
"HDL Coder™: User's Guide", The Math Works, Inc., Sep. 2012, pp. 1-1305.
"Synthesis and Simulation Design Guide", Xilinx, 2008, pp. 1-218.
"Synthesis and Simulation Design Guide", Xilinx, Mar. 1, 2011, pp. 1-178.
Acosta, Alfonso, "ForSyDe: Rising the Abstraction Level in System Design," Royal Institute of Technology, Stockholm, Sweden, Mar. 27, 2008, pp. 1-98.
"Actel Digital Signal Processing (DSP) Solution," Actel Corporation, <http://web.archive.org/web/20071028055746/www.actel.com/products/solutions/dsp/default.aspx>, Oct. 11, 2007, pp. 1-5.
Ahuja, Sumit, "High Level Power Estimation and Reduction Techniques for Power Aware Hardware Design," Virginia Polytechnic Institute and State University, Blacksburg, Virginia, May 12, 2010, pp. ii-43.
Akella, Sreesa, "Guidelines for Design Synthesis Using Synopsys Design Compiler," Department of Computer Science Engineering University of South Carolina, Columbia, South Carolina, Dec. 2000, pp. 1-13.
Allen, Eric et al., "Interactive Object-Oriented Simulation of Interconnected Power Systems Using Simulink," IEEE Transactions Education, vol. 44(1):87-95, Feb. 2001.
Banerjee, Prithviraj et al., "Overview of a Compiler for Synthesizing MATLAB Programs onto FPGAs," IEEE Transactions on Very Large Scale Integration (VLSI) Systems, vol. 12(3):312-324, Mar. 2004.
Bell, et al. "Integration of Hardware into the Labview Environment for Rapid Prototyping and the Development of Control Design Applications", Sep. 8, 2004, IEEE, pp. 79-81.
Benini, et al., Regression Models for Behavioral Power Estimation, Apr. 1998, Integrated Computer-Aided Eng., vol. 5, No. 2, pp. 95-106.
Bjureus, Per et al., "FPGA Resource and Timing Estimation from Matlab Execution Traces," International Conference on Hardware Software Codesign, Proceedings of the tenth international symposium on Hardware/software codesiqn, pp. 31-36, May 2002.
Chen, Deming, et al., "High-Level Power Estimation and Low-Power Design Space Exploration for FPGAs," IEEE, Jan. 2007, pp. 529-534.
Cordy, James R. et al, "GVL: A Graphical, Functional Language for the Specification of Output in Programming Languages," IEEE International Conference on Systems, Man and Cybernetics, pp. 11-22, Mar. 1990.
Dasgupta, Aurobindo, et al., "Simultaneous Scheduling Binding for Power Minimization During Microarchitecture Synthesis," Department of Electrical and Computer Engineering, University of Massachusetts-Amherst, Jan. 1995, pp. 1-6.
English Translation of EP1387260 publication dated Feb. 4, 2004, pp. 1-14.
Goering, Richard, "MathWorks Moving Deeper into IC Design," Sep. 18, 2006, pp. 1-3.
Golin, Eric J., et al., "A Visual Design Environment," Proceedings of the 1993 IEEE/ACM international conference on Computer-aided design, Santa Clara, CA, pp. 364-367, Nov. 1993.
Haldar, Malay et al., "FPGA Hardware Synthesis from MATLAB," Fourteenth International Conference on VLSI Design, pp. 299-304 (Jan. 2001).
Hunt, Neil, "IDF: A graphical data flow programming language for image processing and computer vision," IEEE International Conference on Systems, Man and Cybernetics, pp. 351-360, Nov. 1990.
International Preliminary Report on Patentability for Application No. PCT/US2005/033846, dated Nov. 3, 2006.
International Search Report for Application No. PCT/US2006/036420, dated Jul. 2, 2007.
International Search Report for Application No. PCT/US2007/019734, dated Nov. 11, 2008.
Khouri, et al., "Fast High-level Power Estimation for Control-flow Intensive Designs", 1998, International Symposium on Low Power Electronics and Design Proceedings, pp. 299-304.
Khouri, K.S.; Lakshminarayana, G.; Jha, N.K. "High-level Synthesis of Low-power Control-flow Intensive Circuits", Dec. 1999, IEEE Transactions on CAD of Integrated Circuits and Systems, vol. 18, Issue: 12, pp. 1715-1729.
Khouri, et al., IMPACT: A High-Level Synthesis System for Low Power Control-flow Intensive Circuits, Feb. 23-26, 1998, Proceedings Design, Automation and Test in Europe, pp. 848-854.
Lakshminarayana, G.; Raghunathan, A.; Khouri, K.S.; Jha, N.K.; Dey, S., "Common-case Computation: A High-level Energy and Performance Optimization Technique", Jan. 2004, IEEE Transactions on CAD of Integrated Circuits and Systems, vol. 23, Issue: 1, pp. 33-49.
Leping, et al. "A Simulated Training System of Power Based on Interaction between C# Programs and Simulink", Mar. 2011, IEEE, p. 1-4.
Licko, Miroslav, et al., "MATLAB/Simulink Based Methodology for Rapid-FPGA-Prototyping," P.Y.K. Cheung et al., (Eds.), Lecture Notes on Computer Science, Field-Programmable Logic and Applications, Springer-Verlag, pas. 984-987, Jan. 2003.
Macii, Enrico, et al., "High-Level Power Modeling, Estimation, and Optimization," IEEE, vol. 17, No. 11, Nov. 1998, pp. 1061-1079.
Martins, Sergio et al., "A high-level tool for the design of custom image processing systems," Proceedings of the 2005 8th Euromicro conference on Digital System Design (OSO'05), pp. 346-349 (Sep. 2005).
"MathWorks™ Products for Signal Processing and Communications," The MathWorks, Inc., Mar. 2008, pp. 1-4.
MathWorks, "Stateflow and Stateflow coder, for Complex Logic and State Diagram Modeling, User's Guide, Version 5" The MathWorks, Inc., Jul. 2002.
National Instruments, "LabVIEW User Manual", Apr. 2003, 349 pages.
Nayak, Anshuman et al., "Accurate Area and Delay Estimators for FPGAs," Proceedings of the 2002 Design, Automation and Test in Europe Conference and Exhibition (DATE'02), pp. 862-869, Mar. 2002.
Nebel, "System-level Power Optimization", Digital System Design, 2004, DSD 2004, Euromicro Symposium on, on pp. 27-34.
Ou, Jingzhao et al., "PyGen: A MATLAB/Simulink Based Tool for Synthesizing Parameterized and Energy Efficient Designs Using FPGAs," Proceedings of the 12th Annual IEEE Symposium on Field-Programmable Custom Computing Machines, pp. 47-56 (Apr. 2004).
"Precision RTL Synthesis User's Manual," 2003c Update 1, Mentor Graphics Corporation, Mar. 2004, pp. 1-119.
Pohl, Zdenek et al., "Logarithmic Arithmetic for Real Data Types and Support for Matlab/Simulink Based Rapid-FPGA-Prototyping," International Parallel and Distributed Processing Symposium, Apr. 2003.

(56) References Cited

OTHER PUBLICATIONS

Popinchalk, Seth, "Building Accurate, Realistic Simulink Models," Newsletters, The MathWorks, Inc., Nov. 2006, pp. 1-10.

Popinchalk, Seth, "Improving Simulation Performance in Simulink," The MathWorks, Inc., <http://www.eetimes.com/General/PrintView/4087424>, Apr. 2012, pp. 1-10

Portero, Antoni et al., "Study of High Level design methodologies for a MPEG frames I Compressor for a HW/SW Implementation," 2004 IEEE International Conference on Industrial Technology (ICIT), DOS. 1688-1693 (Dec. 2004).

Radiolab 3G, "The Easier Way to 3G Design Success" RadioScape Ltd. (2003).

Radioscape, "Simulation Drive Testing in Wireless Communications Systems," RadioScape Ltd. (2003).

Raudvere, Tarvo, et al., "Application and Verification of Local Nonsemantic-Preserving Transformations in System Design," IEEE Transactions on Computer-Aided Design of Integrated Circuits and Systems, vol. 27, No. 6, Jun. 2008, pp. 1091-1103.

Sander, Ingo, "System Modeling and Design Refinement in ForSyDe," Royal Institute of Technology, Stockholm, Sweden, Apr. 2003, pp. 1-244.

SIGNALogic®, "Real•Time Composer™ Visual Environment," retrieved online at http://www.siQnalogic.com/index.pl?page=vis_dsp (2004).

SIGNALogic®, "DSPower® Real-Time Code Generator," retrieved online at http://www.signalogic.com/index.pl?p.=rtcg (2004).

Simulink® 7: User's Guide, The Math Works, Inc., Sep. 2009, pp. 1-1528.

The MathWorks, Simulink Model-Based and System-Based Design, Using Simulink, Version 4, The MathWorks, Inc., Jun. 2001.

The MathWorks, Simulink, Model-Based and System-Based Design, Using Simulink, Version 5, The MathWorks, Inc., Jul. 2002.

The MathWorks, "Simulink, Simulation and Model-Based Design, Writing S-Functions. Version 6," The MathWorks, Inc., Mar. 2005.

U.S. Appl. No. 12/963,433, filed Dec. 8, 2010 by Girish Venkataramani, et al. for a Hardware Definition Language Generation for Data Serialization From Executable Graphical Models, all pages.

Vogel. Thomas. "Simulink, sfunctlon with variable sized outputport possible?" retrieved online at: http://www.mathworks.com/matlabcentral/newsreader/view_thread/52973, Aug. 2003.

Woodward, Mike, "Getting Graphical in 3G Wireless Designs," CommsDesign, The MathWorks, Mar. 2003.

Woodward, Mike, "RadioLab 3G—a toolbox for 3G applications," pp. 1-5.

Woodward, Michael, "Getting graphical in wireless 3G designs," International Signal Processing Conference (2003).

"Working With Xilinx® Devices and Place and Route Tools," Altium, AP0112 (v1.0), Jan. 13, 2004, pp. 1-6.

Written Opinion for Application No. PCTIUS2Q06/036420, dated Jul. 2, 2007.

Zacher, Darren, "How to Use Register Retiming to Optimize Your FPGA Designs," Mentor Graphics, <http://www.eetimes.com/design/programmable-logic/4014801/How-to-use-register-retiming-to-optimize-your-FPGA-designs>, EE Times Group a UBM company, Dec. 14, 2005, pp. 1-5.

Fernandez, Michelle, "How to Maximize FPGA Performance," EE Times, Designlines Programmable Logic, UBM Electronics, Jan. 15, 2007, pp. 1-5.

Thatte, Sanjay, "FPGA Synthesis Can Be a Leverage Point in Your Design Flow," EE Times, Designlines Programmable Logic, UBM Electronics, Dec. 2, 2009, pp. 1-5.

Venkataramani, Girish, et al., "Global Critical Path: A Tool for System-Level Timing Analysis," ACM, DAC 2007, San Diego, CA, Jun. 4-8, 2007, pp. 1-4.

Zhang, Jiyu, et al., "Bit-Level Transformation and Optimization for Hardware Synthesis of Algorithmic Descriptions," Aug. 2009, pp. 1-8.

Zhong, Lin, et al., "Power Estimation for Cycle-Accurate Functional Descriptions of Hardware," Nov. 2004, pp. 1-8.

\* cited by examiner

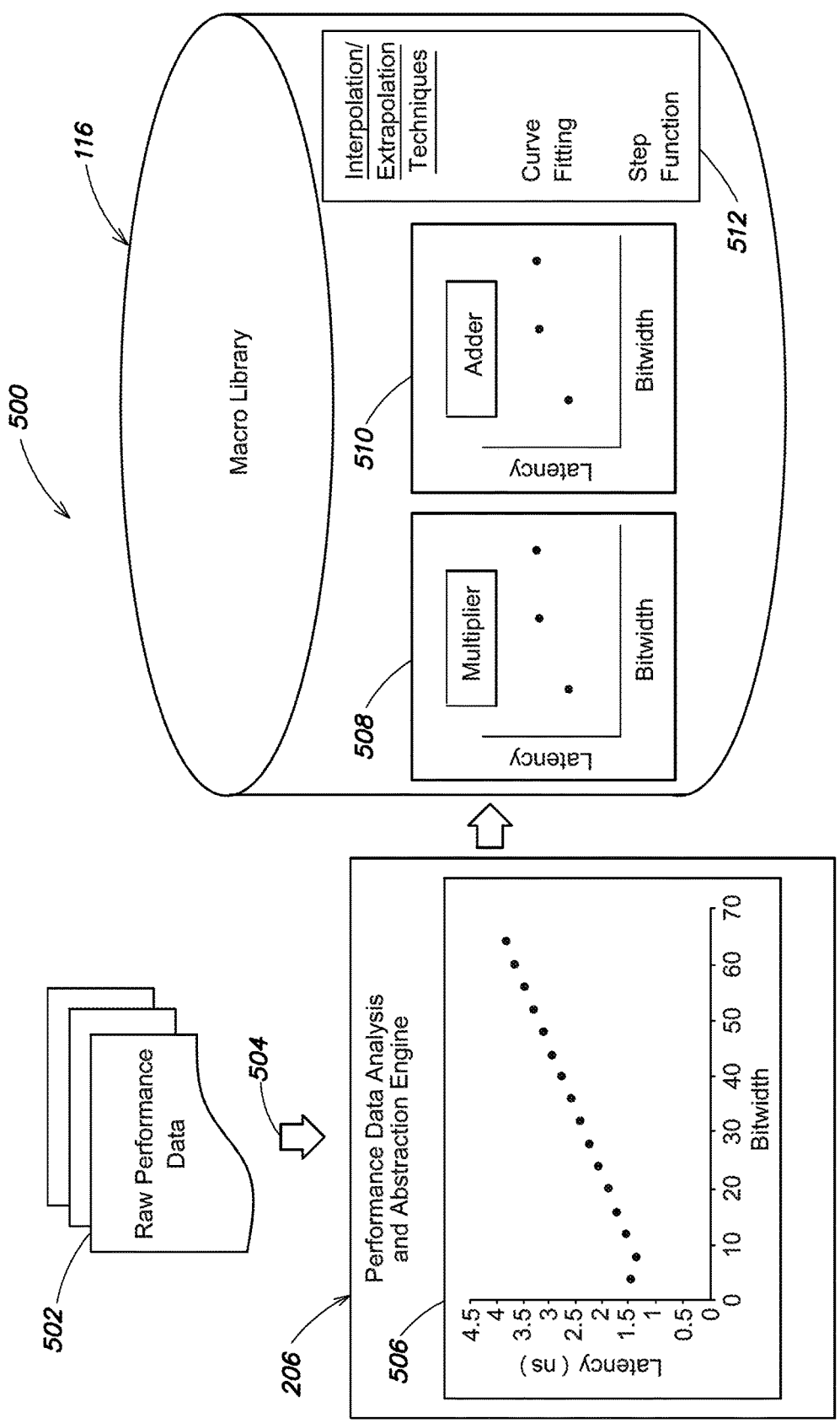

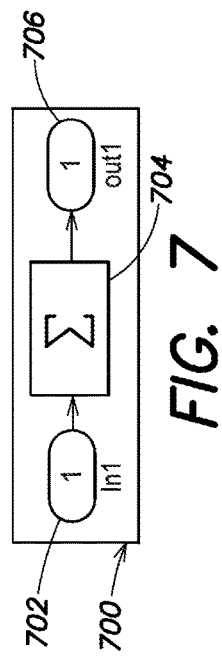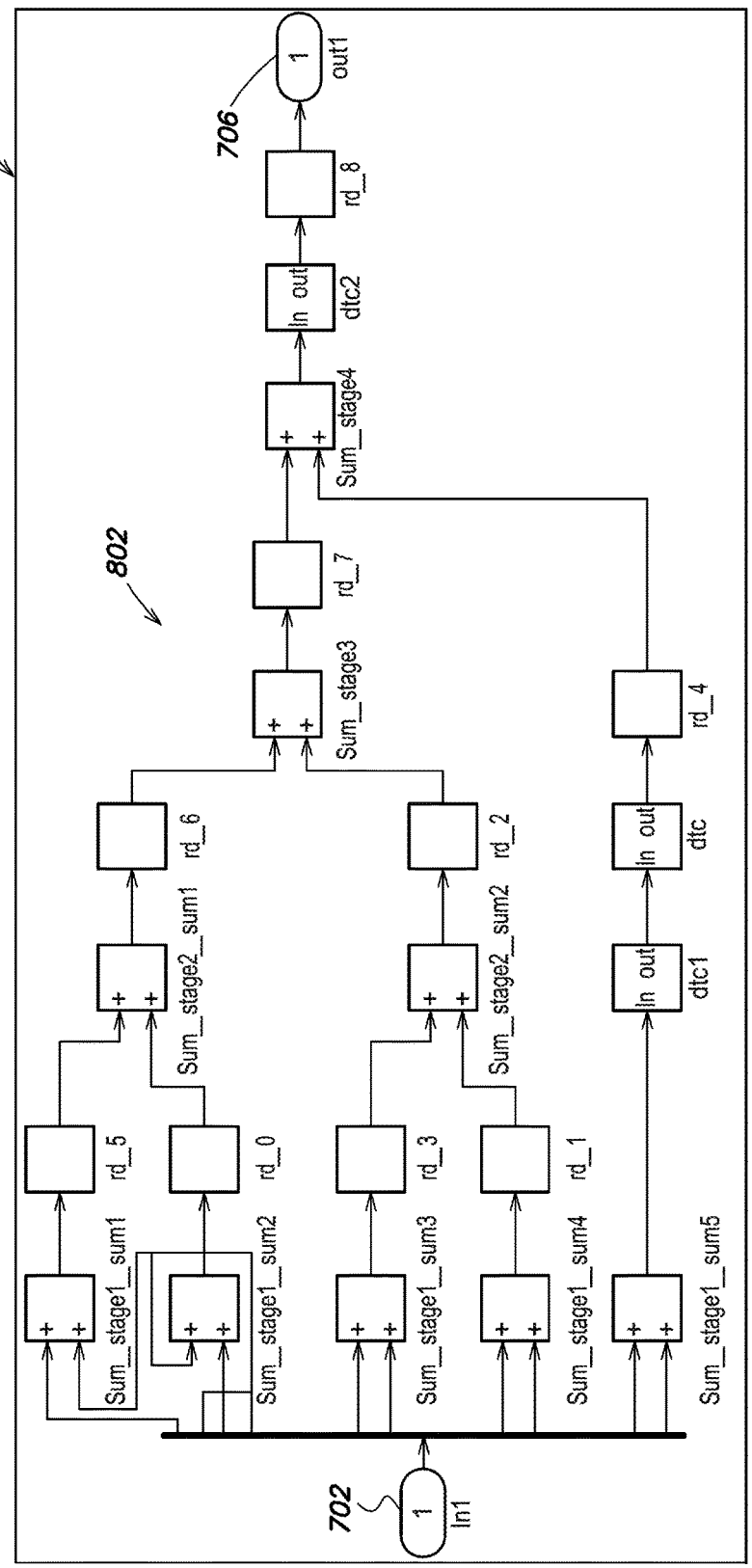

SYSTEMS AND METHODS FOR ESTIMATING PERFORMANCE CHARACTERISTICS OF HARDWARE IMPLEMENTATIONS OF EXECUTABLE MODELS

CROSS-REFERENCE TO RELATED APPLICATIONS

The present application claims the benefit of U.S. Provisional Patent Application Ser. No. 61/912,214, filed Dec. 5, 2013, by Girish Venkataramani, Yongfeng Gu, and Rama Kokku for TARGET AGNOSTIC METHODOLOGY FOR TARGET-SPECIFIC HARDWARE CHARACTERIZATION OF EXECUTABLE MODELS, which application is hereby incorporated by reference in its entirety.

BRIEF DESCRIPTION OF THE DRAWINGS

The disclosure below refers to the accompanying drawings, of which:

FIG. 5 is a schematic diagram illustrating the processing performed by a performance data analysis and abstraction engine in accordance with an embodiment;

FIG. 7 is a schematic diagram illustrating a subsystem in accordance with an embodiment;

FIG. 8 is a schematic diagram illustrating the subsystem of FIG. 7 lowered to reveal core components in accordance with an embodiment;

DETAILED DESCRIPTION OF ILLUSTRATIVE EMBODIMENTS

Figure 1:
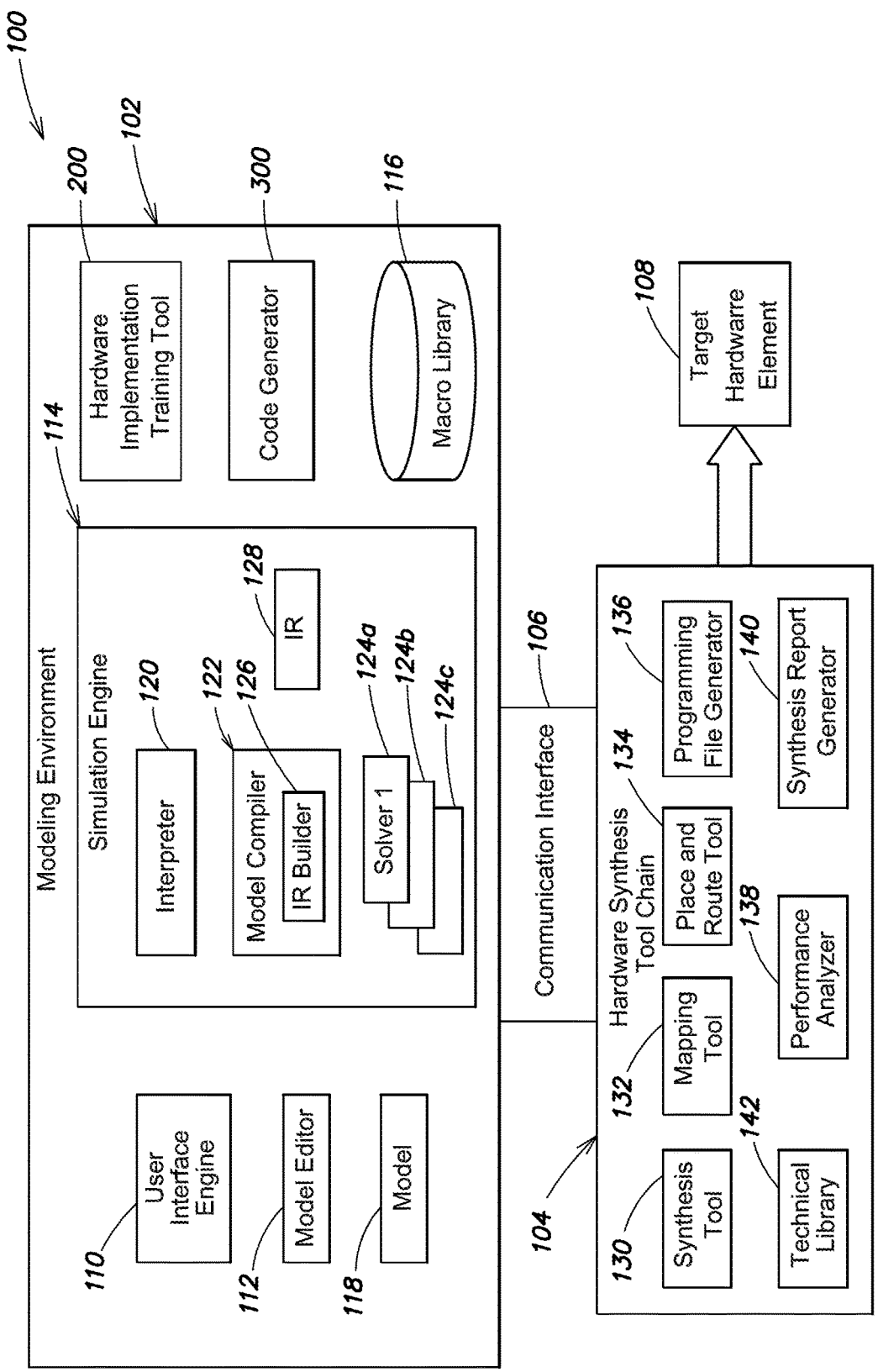
FIG. 1 is a schematic diagram a hardware development and optimization system in accordance with an embodiment.

Briefly, embodiments of the disclosure relate to systems and methods, including workflows, for automatically generating optimized hardware description language (HDL) code for an executable model developed in a modeling environment. The executable model may be a graphical model, such as a block diagram that may represent a system. The model may include a plurality of model elements, such as blocks, and may further include connections among the model elements. Model elements may represent dynamic systems, state-based systems, and message-based systems, among others, and connections may represent signals, state transitions, events, control flow, and dataflow, among other communication types.

A training tool may include a storage unit containing pre-defined scripts for execution by a hardware synthesis tool chain. The pre-defined scripts may direct the hardware synthesis tool to synthesize target hardware for a plurality of core components defined by the modeling environment. A core component may constitute a base or atomic element of a modeling environment, such as a minimum and characterizable element. Core components may be combined with other core components to form model elements, but which cannot itself be broken down. The hardware synthesis tool chain may execute the scripts and generate one or more synthesis reports that include performance characteristics for hardware components selected by the hardware synthesis tool chain to implement the core components specified in the pre-defined scripts. The performance characteristics may include one or more of timing, area, and power consumption. The modeling environment may access the performance characteristics in the one or more synthesis reports, and may map the performance characteristics to the corresponding core components of the modeling environment. The modeling environment may construct a macro library that stores the mapping between performance characteristics generated by the hardware synthesis tool chain and core components of the modeling environment.

A model or parts of a model created in the modeling environment may be designated for HDL code generation. An optimization tool may analyze the model, and annotate the model's elements using the performance characteristics stored in the macro library. One or more constraints may be specified for a hardware implementation of the model, and the optimization tool may determine whether the one or more constraints are satisfied based on the performance characteristics of the model's elements. If the one or more constraints are not satisfied, the optimization tool may select one or more optimization techniques, and apply the one or more optimization techniques to the model. To the extent the one or more constraints concerns timing, the optimization tool may perform static timing analysis of the model using a modified technique that takes account of the semantics or properties of models created in the modeling environment. Application of the one or more optimization techniques may result in modifications to the original model, and may thus result in the generation of a revised model. The revised model may be analyzed to determine whether it satisfies the one or more constraints. If not, one or more optimization techniques may again be selected and applied to the revised model. This process may be repeated until the one or more constraints are satisfied, or a termination criterion is met. The optimization tool may output a final model that either satisfies the one or more constraints, or that represents the final iteration before the termination criterion was met. Alternatively or additionally, the optimization tool may generate a configuration report that describes the modifications that, if made to the original model, will result in the one or more constraints being satisfied, or that represent a final version before the termination criterion was met.

FIG. 1 is a schematic diagram of a hardware development and optimization system 100. The system 100 may include a modeling environment 102 and a synthesis tool chain 104. The modeling environment 102 and the synthesis tool chain 104 may be in communicating relationship through a communication interface 106, such as an Application Programming Interface (API), Remote Procedure Calls (PRCs), and/or Local Procedure Calls (LPCs), among other communication techniques. The synthesis tool chain 104 may synthesize a target hardware element 108. The target hardware element 108 may be an Application Specific Integrated Circuit (ASIC), a Field Programmable Gate Array (FPGA), a Complex Programmable Logic Device (CPLD), a Systems on a Chip (SoC), etc.

The modeling environment 102 may include a user interface (UI) engine 110, a model editor 112, a simulation engine 114, a hardware implementation training tool 200, a code generator 300, and a macro library 116. The UI engine 110 may create and present one or more User Interfaces (UIs), such as Graphical User Interfaces (GUIs) and/or Command Line Interfaces (CLIs), on one or more display devices of a computer processing device. The one or more GUIs and/or CLIs may be operated by users to perform various modeling tasks, such as opening, creating, and saving models, such as a computer-generated, executable graphical model 118. The GUIs and/or CLIs may also be used to enter commands, set values for parameters and properties, run models, change model settings, etc. The model editor 112 may perform selected operations, such as open, create, edit, and save, in response to user inputs.

The simulation engine 114 may include an interpreter 120, a model compiler 122, and one or more solvers, such as solvers 124a-c. The model compiler 122 may include one or more Intermediate Representation (IR) builders, such as IR builder 126. The simulation engine 114 may generate execution instructions for the model 118, and execute, e.g., compile and run or interpret, the model 118, using one or more of the solvers 124a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair.

The IR builder 126 may construct one or more in-memory representations or IRs from the model 126. In an embodiment, the IR builder 126 may construct an IR 128 that corresponds to the model 118. For example, the structure of the IR 128 may correspond to the structure of the model 118, for example nodes of the IR may map directly to elements of the model.

The synthesis tool chain 104 may include a plurality of components. Specifically, the synthesis tool chain 104 may include a synthesis tool 130, a mapping tool 132, a place and route tool 134, a programming file generator 136, a performance analyzer 138, and a synthesis report generator 140. The synthesis tool chain 104 also may include a technical library 142.

In some embodiments, the modeling environment 102 is a high-level modeling environment. Suitable high-level modeling environments include the MATLAB® algorithm development environment and the Simulink® model-based design environment from The MathWorks, Inc., as well as the Simscape™ physical modeling system and the Stateflow state chart tool also from The MathWorks, Inc., the Maple-Sim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) product from Agilent Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., the Modelica modeling language from the Modelica Association, and the SCADE Suite from Esterel Technologies S.A.S. of Elancourt, France, among others. Models created in the high-level modeling environment may contain less implementation detail, and thus operate at a higher level than certain programming languages, such as the C, C++, C#, and SystemC programming languages.

Those skilled in the art will understand that the MATLAB® algorithm development environment is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In another embodiment, a lower level programming language, such as the C, C++, C#, and SystemC programming languages, among others, may be used to create one or more models.

Models constructed within the modeling environment 102 may include textual models, graphical models, such as block diagrams, and combinations of graphical and textual models. A given model may simulate, e.g., approximate the operation of, a system. Exemplary systems include weather systems, financial markets, plants, controllers, etc. A model may be executed in order to simulate the system being modeled, and the execution of a model may be referred to as simulating the model. For example, a GUI generated by the UI engine 110 and presented on a display of a data processing system may include a Run command that may be selected by a user to execute the model 118. Alternatively, a user may enter a run command in a CLI generated by the UI engine 110. In response to the user selecting the Run button or entering the run command, the simulation engine 114 may execute the model 118, and may present the results of the model's execution to the user, e.g., on a display.

The GUI generated by the UI engine 110 also may include a Code Generation command that may be selected by the user. Alternatively, the user may enter a code generation command in the CLI. In response to the user selecting the Code Generation button or entering the code generation command, the code generator 300 may generate code for at least part of the model 118.

Figure 2:
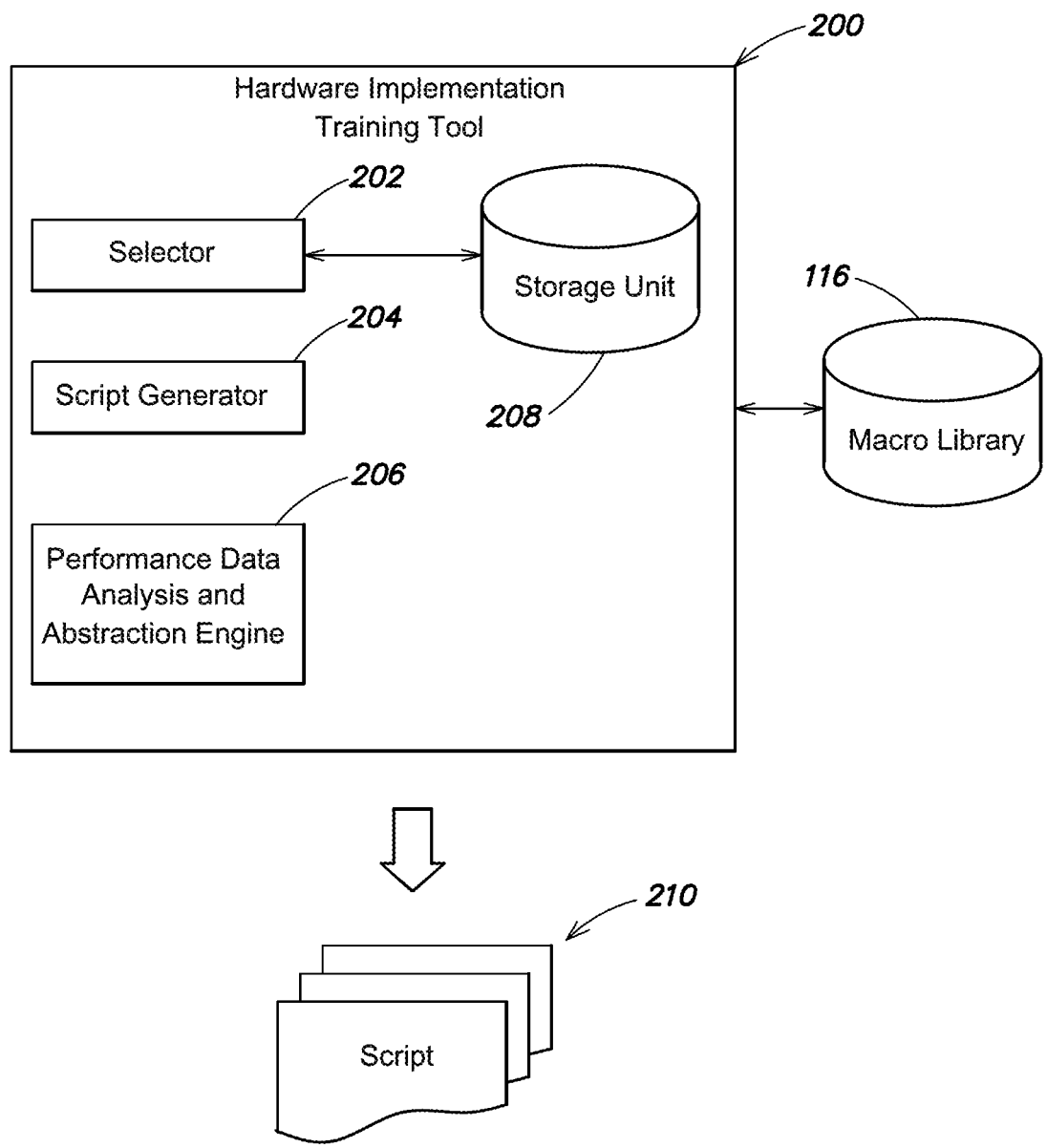
FIG. 2 is a schematic diagram of a hardware implementation training tool in accordance with an embodiment.

FIG. 2 is a schematic diagram of the hardware implementation training tool 200, which may include a selector 202, a script generator 204, and a performance data analysis and abstraction engine 206. The hardware implementation training tool 200 also may include a storage unit 208 that may contain a plurality of scripts, at least some of which may be predefined scripts. The storage unit 208 may be accessible by the selector 202, and the tool 200 may output a selected set of scripts 210. The hardware implementation training tool 200 may have access to the macro library 116.

Figure 3:
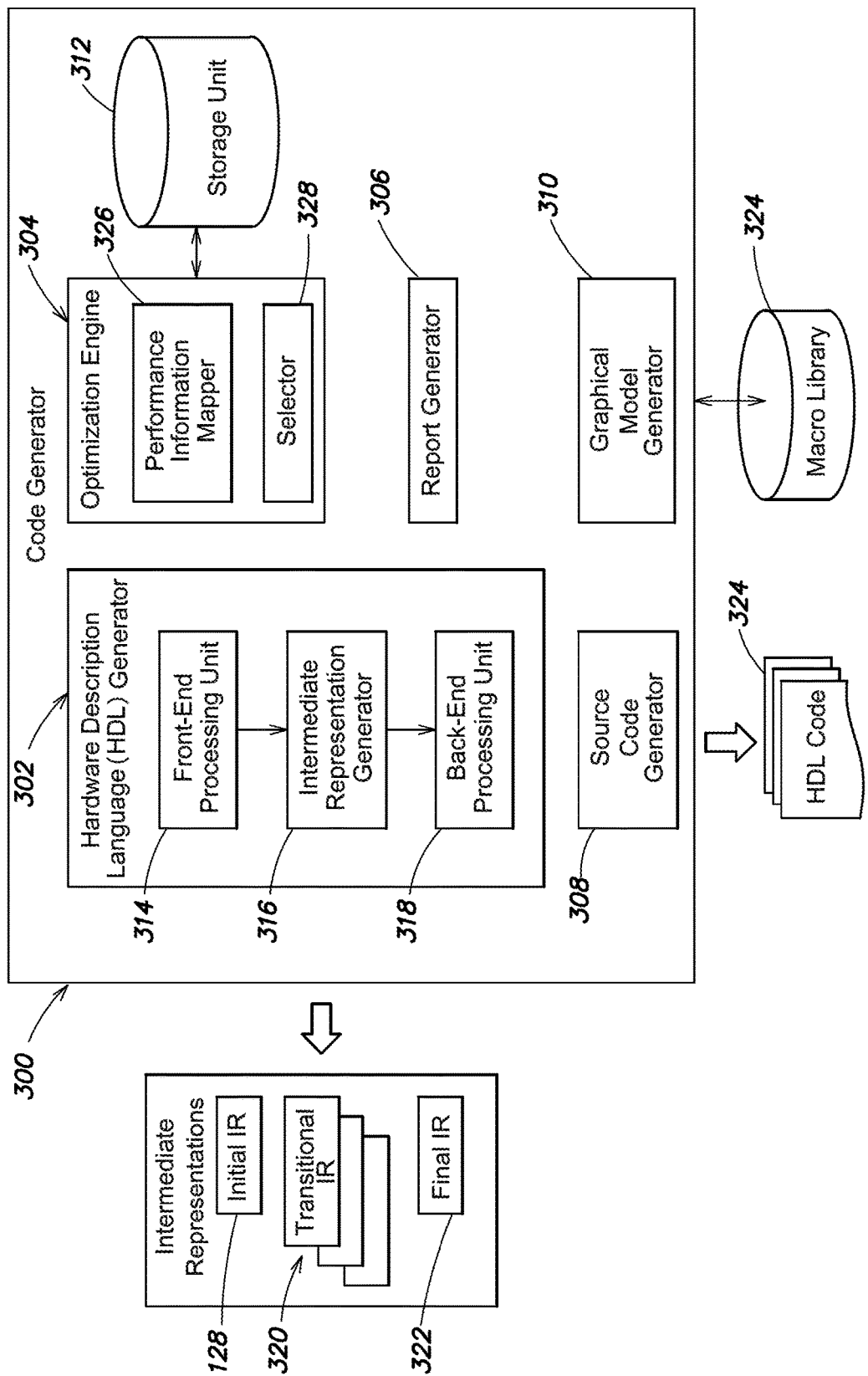
FIG. 3 is a schematic diagram of a code generator in accordance with an embodiment.

FIG. 3 is a schematic diagram of the code generator 300. The code generator 300 may include a hardware description language (HDL) generator 302, an optimization engine 304, a report generator 306, a source code generator 308, and a graphical model generator 310. The optimization engine 304 may have access to a storage unit 312 that stores optimization techniques. The HDL generator 302 may include a front-end processing unit 314, an intermediate representation (IR) generator 316, and a back-end processing unit 318.

The IR generator 316 of the code generator 300 may be the same as the IR builder 126 of the model compiler 122, or it may be a different IR generator/builder. The IR generator 316 may construct or receive the IR 128 for the model 118, which may be referred to as an initial IR. As described, the IR generator 320 may apply one or more transforms to the initial IR 128, resulting in the generation of a plurality of transitional IRs, indicated generally at 320, and ending with a final IR 322, from which code, such as HDL code 324 may be generated.

The optimization engine 304 may include a performance information mapper 326 and a selector 328. The code generator 300 may have access to the macro library 116. The code generator 300 also may include or have access to, e.g., be in communication with, a validation engine (not shown). The validation engine, which may be part of the modeling environment 102, may receive the source model 118 and a validation model generated by the graphical model generator 310, and may run them to produce validation results for evaluation, e.g., by a user and/or programmatically.

The hardware implementation training tool 200 may obtain performance characteristics generated by the synthesis tool chain 104 for hardware components that correspond to model elements, defined by the modeling environment 102 and available to users to create or edit a model, such as the model 118. The performance characteristics generated by the synthesis tool chain 108 may be specific to a particular type of target hardware element, such as a particular type of ASIC, a particular type of FPGA, etc. The hardware implementation tool chain 200 may store the performance characteristics obtained from the hardware synthesis tool chain 104 in the macro library 116.

The code generator 300 may operate upon the model 118 created or identified by the user. The model 118, which may be referred to as a source model, may be a high-level functional or behavioral model, such as a Simulink model, a Stateflow chart, a LabVIEW block diagram, a VEE diagram, etc. The code generator 300 may utilize the performance characteristics stored in the macro library 116 to determine the performance of the model 118 when implemented in hardware by the synthesis tool chain 104. The code generator 300 may optimize the model 118 so that HDL code having better performance may be generated. The code generator 300 may produce the HDL code 324 from the optimized version of the source model 118. The generated HDL code 324 may be bit true and cycle accurate (modulo a well-defined latency, for example an initial latency) to the simulation of the source model 118. Exemplary HDL code 324 generated by the code generator 300 include VHDL code, Verilog code, SystemC code, System Verilog code, embedded MATLAB code, vendor or target specific HDL code, such as Xilinx FPGA libraries, etc.

In an embodiment, the hardware implementation training tool 200 and the code generator 300 may be implemented through one or more software modules or libraries containing program instructions and data structures pertaining to the methods described herein. The software modules may be stored in one or more memories, such as a main memory, a persistent memory and/or on computer readable media, of a workstation or other data processing machine or device, and executed by one or more processing elements, such as a general purpose processor, a central processing unit, etc. Other computer readable media may also be used to store and execute these program instructions, such as non-transitory computer readable media, such as optical, magnetic, or magneto-optical media. In another embodiment, the hardware implementation training tool 200 and the code generator 300 may be implemented in hardware comprising registers and combinational logic configured and arranged to produce sequential logic circuits. In alternative embodiments, various combinations of software and hardware, including firmware, may be utilized to implement the invention.

The storage units 208 and 312 may be implemented through one or more data structures, such as linked lists, tables, databases, etc., stored in a memory.

It should be understood that FIGS. 1-3 are meant for illustrative purposes, and that the modeling environment 102, the hardware implementation training tool 200, the code generator 300, and the synthesis tool chain 104 may be implemented in other ways. For example, the hardware implementation training tool 200 and/or the code generator 300, or one or more components thereof, may be separate from the modeling environment 102. In such cases, the hardware implementation training tool 200 and/or the code generator 300 may be in communication with the modeling environment 102 through local procedure calls (LPCs), remote procedure calls (RPCs), or one or more Application Programming Interfaces (APIs).

Suitable code generators for use with the present invention include, but are not limited to, the Simulink Coder, the Embedded Coder, and the Simulink HDL Coder products from The MathWorks, Inc. of Natick, Mass., and the TargetLink product from dSpace GmbH of Paderborn Germany. Nonetheless, other code generation systems and other compilers may be used.

The hardware implementation training tool 200 may receive a designation of a particular hardware synthesis tool chain, such as the tool chain 104, and a designation of a particular type of target hardware element, such as the target hardware element 108. For example, the hardware implementation training tool 200 may receive a command directing it to construct the macro library 116 for a particular hardware synthesis tool chain and a type of target hardware element. In some embodiments, a user may enter a command at a CLI generated by the UI engine 110. The command may include options that specify the particular hardware synthesis tool chain and the particular type of target hardware element. The hardware synthesis tool chain and the type of target hardware element may be identified by vendor and/or product name. The hardware implementation training tool 200 may generate the macro library 116 automatically in response to this command.

The selector 202 may perform a search of the storage unit 208, and identify one or more scripts to be used in the creation of the macro library 116 for the hardware synthesis tool chain 104 and the target hardware element that were identified to the hardware implementation training tool 200.

In some embodiments, the model editor 112 of the modeling environment 102 supports the creation of executable models. The modeling environment 102 may include a plurality of pre-defined model element types that may be selected by a user to create or revise a model. In response to the user's selection of a model element type, the model editor 112 may add a model element of the selected type to the model being created or revised. Model elements may perform particular functions or operations that may range from simple operations to complex operations, including Integration of a signal (Integrator block), Output time derivative of an input signal (Derivative block), Infinite Impulse Response filtering of a signal (Discrete Filter block), Finite Impulse Response filtering of a signal, Multiply an input signal by a constant (Gain block), Multiply or divide input signals (Product block), Add or subtract input signals (Sum block), etc. A model element that performs a high-level function or operation may itself be implemented with one or more model elements performing lower-level functions or operations. For example, an array-based Sum block may be implemented with Add and Subtract blocks.

Model elements that implement elementary or base level functions or operation may be referred to as core components. A core component represents a model element that cannot be lowered or reduced to any lower-level model elements or components. Exemplary core components include Add, Multiply, Delay, AND, OR, Compare, and Switch blocks, among others. That is, while a model may be defined using a plurality of model elements implementing high-level functions or operations, such as a filter operations, internally these high-level model elements may be lowered to a plurality of core components. Typically, a model element that implements a high-level function or operation will be made up of a plurality of core components.

In an embodiment, the selector 202 may choose scripts from the storage unit 208 that are in a format compatible with the hardware synthesis tool chain 104, and that direct the hardware synthesis tool chain 104 to synthesize hardware components for core components of the modeling environment 104. Multiple scripts for a given core component may be selected where the multiple scripts specify different characteristics, qualities or features for the core component, such as different bitwidths, e.g., 6, 8, 12 bit-widths, different maximum and/or minimum fan-in or fan-out values, etc. Other characteristics may include the number of inputs. For example, multiple scripts may be defined and selected for a switch or multiplexer block where the multiple scripts specify different numbers of inputs to the switch or multiplexer block. Another characteristic may be number of iterations. For example, multiple scripts may be defined and selected for model elements, such as trigonometric blocks, logarithmic blocks, exponential blocks, etc., implementing cordic functions where the multiple scripts specify different numbers of iterations. Other characteristics may include or relate to parameters of core components.

The scripts may be written as Tool Command Language (tcl) code snippets, or in other languages. In some embodiments, Register-Transfer Level (RTL) templates may be used to generate RTL script instances for different configuration parameters, e.g., different bitwidths, etc. The RTL templates may be stored in the storage unit 208.

In some embodiments, the characteristics may be tunable, e.g., by a user. For example, the user may focus the collection of performance data to characteristics, qualities or features typically employed by the user during hardware design. For example, a given user may use Adders between 8 and 16 bits. In this case, the given user may tune the training process to obtain performance data for Adders between 8 and 16 bits, instead of using the default scripts, which may only obtain performance data on Adders at 4, 8, and 16 bits. The UI engine 110 may present a GUI through which a user may set options for tuning the scripts.

Scripts may also include constraints on timing, area, or power. In this way, the scripts may direct the hardware synthesis tool 104 to choose particular implementations of hardware components when performing synthesis based on the scripts. For example, if a script imposes a timing constraint, the hardware synthesis tool may choose hardware components that might require more area, but that operate faster thus complying with the timing constraint. In some embodiments, the scripts may include one or more synthesis directives, such as pragmas and attributes, in a format recognized by the targeted hardware synthesis tool chain 104. The synthesis directives may set options at the hardware synthesis tool chain 104 and/or otherwise control or direct the synthesis process.

For the same target hardware element, multiple scripts may be provided that cover different timing or area constraints. For example, for a given core component, there may be a 100 MHz script, a 100-250 MHz script, etc. Alternatively, the hardware implementation training tool 200 may receive an input, such as a user input, specifying a timing or area constraint to be used. Accordingly, a user may customize the training process.

A user may create one or more custom HDL scripts for use in creating the macro library 116. More specifically, the user may operate the script generator 204, e.g., through a GUI or CLI created by the UI engine 110, to create the custom HDL scripts. The custom HDL scripts may also be stored in the storage unit 208.

The pre-defined scripts identified by the selector 202 as well as any custom-scripts created and/or identified by the user may be provided by the modeling environment 102 to the hardware synthesis tool chain 104.

The hardware synthesis tool chain 104 runs the pre-defined and custom scripts received from the hardware implementation training tool 200, causing the tool 104 to synthesize hardware components for the core components specified in the scripts. The synthesis tool chain 104 may convert the scripts to one or more technology and target specific bitstreams or gate-level representations for configuring the target hardware element 108.

The synthesis process may involve a number of stages. For example, the synthesis tool 130 may convert the received scripts into one or more netlist files. The mapping tool 132 may map logic in the netlist files to hardware components available on the target hardware, such as logic cells, I/O cells, lookup tables, etc. For an ASIC, logic may be mapped to standard cells from a user-provided ASIC technology library. The synthesis tool 130 and/or the mapping tool 132 may access the technical library 142 to select particular hardware components and hardware component implementations. The mapping tool 132 may produce one or more native circuit description (NCD) files. The place and route tool 134 may receive the NCD files and select fixed positions on the target hardware element 108 for the hardware components. The place and route tool 134 may also route required connections between the placed hardware components using the target hardware's routing channels. The place and route tool 134 may produce one or more revised NCD files. The programming file generator 136 may receive the revised NCD files from the place and route tool 134, and generate one or more files suitable for configuring the target hardware element 108, such as bitstream files. The bitstream files may be used directly to configure the target hardware element 108. For example, the synthesis tool chain 104 may be connected to the target hardware 108, and the bitstreams downloaded to the target hardware element 108. To configure an ASIC, the hardware synthesis tool chain 104 may generate a target-specific, gate-level representation rather than a bitstream. The hardware synthesis tool chain 104 may also generate other files, such as a Standard Delay Format (SDF) file.

In an embodiment, the hardware synthesis tool chain 104 may be directed not to configure the target hardware element 108 based on the scripts.

The performance analyzer 138 may determine the utilization and performance of the hardware implementation of the scripts. The synthesis report generator 140 may generate one or more synthesis reports that specify the timing, area, and/or power characteristics of the hardware components selected during the synthesis process in response to the received scripts, including the timing, area, and power characteristics as determined by the performance analyzer 138.

The hardware implementation training tool 200 may access the synthesis report generated by the synthesis tool chain 104. For example, the synthesis tool chain 104 may expose an Application Programming Interface (API) through which an application may access the synthesis reports and/or data included in the synthesis reports or in databases or records created by the synthesis tool chain 104. The hardware implementation training tool 200 may utilize this API to access the synthesis report. It should be understood that the format and information included in a particular synthesis report may vary depending on the vendor of the synthesis tool chain 104. The hardware implementation training tool 200 may be configured with vendor-specific information concerning the format and information available from the synthesis reports generated by the synthesis tool chains of one or more vendors. The hardware implementation training tool 200 may utilize this vendor-specific information to form API calls to the synthesis tool chain 104 to obtain the synthesis report or data therefrom.

In particular, the hardware implementation training tool 200 may utilize this vendor-specific information to filter the synthesis report for particular information it utilizes to map performance characteristics to corresponding core components of the modeling environment. Information concerning the API and/or API calls may be stored in a storage unit accessible by the hardware implementation training tool 200. The hardware implementation training tool 200 may perform a lookup on this storage unit and retrieve the API and/or API calls to be used with a particular synthesis tool chain 104 to obtain the information utilized by the tool 200. The hardware implementation training tool 200 may have specific knowledge about each synthesis tool 104, such knowledge may include all necessary API calls and structure to set constraints, initiate the synthesis tool 200 and extract performance data. Accordingly, the hardware implementation training tool 200 may interoperate with synthesis tool chains 104 from different vendors. That is, while the synthesis tool chain 104 may be made by Vendor A, it could be swapped out with a synthesis tool chain made by Vendor B.

In some embodiments, the hardware synthesis tool chain 104 may also generate an in-memory representation of performance data. For example, instead of a synthesis report, a hardware synthesis tool chain may generate design objects. The design objects may be in-memory data structures that may resemble a C++ class, and may include performance data. The hardware implementation training tool 200 may access these design objects and extract performance data. For example, the hardware implementation training tool 200 may issue methods and/or function calls to the design objects, and in response obtain performance data.

Exemplary synthesis tool chains include the Design Compiler from Synopsys, the Encounter RTL Compiler from Cadence, Quartus from Altera, ISE from Xilinx, Precision RTL from Mentor Graphics, and Vivado Design Suite from Xilinx, among others.

The performance data analysis and abstraction engine 206 may analyze the performance data derived from the synthesis report. Specifically, the performance data analysis and abstraction engine 206 may construct one or more performance data graphs from the received performance data, and load these graphs in the macro library 116. The performance data graphs may correspond to the core components identified by the scripts.

In an embodiment, each script is designed to cause the hardware synthesis tool chain 104 to perform a synthesis run on a single core component of the modeling environment 102 for a given bandwidth or other characteristic. Thus, there may be no need for the performance data analysis and abstraction engine 206 to differentiate the performance data among different modeling elements, such as different blocks or functions, defined by the modeling environment. The performance data analysis and abstraction engine 206 may distill or retrieve the performance data directly from the synthesis report, for example utilizing the API provided by synthesis tool chain 104. For a core combinational component, the performance data may include the critical path latency, port-to-port delays, standard area number, and static power consumption. A combinational component may refer to a component whose outputs are purely a function of the component's present inputs.

In an embodiment, the performance data analysis and abstraction engine 206 may also generate and load performance data for one or more high-level model elements into the macro library 116. For a high-level model element, such as a FIR filter, a reciprocal, a square root, etc., or an element having state, such as a delay, the performance data analysis and abstraction engine 206 may perform some analysis on the performance data obtained from the hardware synthesis tool chain 104 for the core components that make up the high-level model element, e.g., to derive a critical path latency or area. For example, for a high-level model element, the performance data analysis and abstraction engine 206 may assign the longest of the following paths, to the extent they exist, as the latency for the high-level model element:

1.) for each input port, the longest path (in terms of latency) from that input to any register within the high-level model element;

2.) the longest path between any two registers within the high-level model element;

3.) for each output port, the longest path from any register within the high-level model element to that output port; and 4.) the longest combinational, feed-forward path in the subsystem, e.g., the longest path from an input port to an output port without any delay (i.e., registers) on the path. For area and power, the performance data analysis and abstraction engine 206 may sum the area data and may sum the power data for the core components that make up the high-level model element.

FIG. 5 is a schematic diagram 500 illustrating the processing that may be performed by the performance data analysis and abstraction engine 206. Raw performance data 502 filtered from the synthesis report may be received at the performance data analysis and abstraction engine 206, as indicated by arrow 504. For a given core component, the raw performance data may include the latencies of the hardware component(s) synthesized for the given core component at various bitwidths, as indicated by the plot 506. The performance data analysis and abstraction engine 206 may abstract the performance data, and create one or more sparse Lookup Tables (LUTs) containing the abstracted performance data. For example, the performance data analysis and abstraction engine 206 may create a first sparse LUT 508 for a Multiplier core component, and a second sparse LUT 510 for an Adder core component, and may load these LUTs 508 and 510 into the macro library 116. The sparse LUTs 508 and 510 may include less than all of the raw performance data 502 filtered from the synthesis report.

In addition to creating the sparse LUTs 508 and 510, the performance data analysis and abstraction engine 206 may include or at least associate an interpolation and extrapolation technique to be used with the sparse LUTs 508 and 510 as indicated generally at 512. For example, the performance data analysis and abstraction engine 206 may specify a particular interpolation and/or extrapolation technique, such as curve fitting or step function, to be used with the sparse LUTs 508 and 510 when a latency value is desired for a bitwidth that is not included in the sparse LUTs 508 and 510. In addition, the performance data analysis and abstraction engine 206 may apply a user-specified interpolation and/or extrapolation algorithm or technique.

To the extent the scripts used to generate performance data included constraints, e.g., on timing, area, or power, this information may also be included in the data structures stored in the macro library 116. For example, the training tool 200 may access information on the hardware synthesis tool chain 104 to the effect that, if the scripts did not specify any constraints, the hardware synthesis tool 104 may choose hardware components that are optimized for area. Accordingly, performance data obtained from the hardware synthesis tool chain 104 based on scripts that did not include constraints may be stored by the training tool 200 as representing the smallest area implementations for the corresponding core components.

It should be understood that once the hardware implementation training tool 200 has run once for a given hardware synthesis tool chain and type of target hardware component, and the obtained data has been processed, abstracted and loaded into the macro library 116, the training process for the given hardware synthesis tool chain and type of target hardware component may be complete. That is, the training process does not have to be run again for that combination of hardware synthesis tool chain and type of target hardware element.

Generating Optimized HDL Code

The code generator 300 may receive an indication or identity of an executable model, such as the model 118, or a portion thereof. The code generator 300 also may receive a designation of a type of synthesis tool chain to be used to implement the designated model in hardware, and a designation of the type of target hardware element. The type of synthesis tool chain may be designated by vendor and model names. It may further be designated by the version of software being used by the synthesis tool chain.

The type of target hardware element may be designated by vendor name and model name. For FPGAs, the hardware element designation may include Family, Part, and Speed grade. For ASICs, the hardware element designation may include technology library. The code generator 300 may receive other information or options concerning the hardware synthesis to be performed. For example, the code generator 300 may receive a designation of the bitwidth to be provided on the target hardware element being synthesized. The code generator 300 also may receive one or more constraints on a hardware implementation of the model or a request to generate an optimized hardware implementation.

Exemplary constraints include constraints concerning timing, area, and/or power. For example, a timing constraint may relate to the clock speed at which the target hardware element 108 is to operate, such as 200 MHz, 500 MHz, 1 GHz, etc. The timing constraint may be specified globally for the target hardware element 108. Alternatively, the timing constraint may be specified for a particular path through the model 118. An area constraint may specify a maximum number of logic elements, such as Lookup Tables (LUTs), Multipliers, Registers, Logic Slices, Digital Signal Processors (DSPs), Random Access Memory (RAM) blocks, Floating Point Units, Intellectual Property (IP) blocks for the target hardware element 108. A power constraint may specify a maximum power for the target hardware element 108.

In some embodiments, the UI engine 110 may generate a user interface, such as a graphical user interface (GUI), for presentation to the user, e.g., on a display of a data processing device. The GUI may include one or more controls through which the user may select or specify options, such as the identification of the model 118 or one or more subsystems or other portions of the model 118 for which code generation is to be performed, and the one or more constraints. The GUI also may include one or more command buttons through which the user may initiate code generation for the identified model or portion thereof. The GUI also may include a graphical affordance, such as one or more drop down lists, that may list the synthesis tool chain vendors and the target hardware element types supported by the modeling environment 102. A synthesis tool chain and type of target hardware element may be designed by a user through the one or more drop down lists.

It should be understood that the UI engine 110 may additionally or alternatively present one or more Command Line Interfaces (CLIs) through which a user may identify the model 118 or portions thereof, specify the one or more constraints, designate a hardware synthesis tool chain and type of target hardware element, and initiate an automated optimized code generation process.

The code generator 300 may start the process for generating code, such as Hardware Description Language (HDL) code 324, for the model 118 that is intended for the specified hardware synthesis tool chain to implement the model 118 on the specified target hardware element. In an embodiment, several stages may be involved in generating HDL code for the model 118. In particular, the front-end processing unit 314 may perform a number of preliminary tasks, such as analyzing the syntax and semantics of the model 118, error detection and reporting, capturing dataflow relationships, determining block semantics, such as the type of block, determining particular block and/or subsystem parameter settings, as established by the user, etc. This information may be provided by the front-end processing unit 314 to the Intermediate Representation (IR) generator 316.

The IR generator 314 may generate one or more in-memory representations, such as Intermediate Representations (IRs), of the source model 118. As mentioned, the IR generator 220 may construct the initial IR 128, which may correspond to the model 118. For example, the initial IR 128 may include a plurality of nodes interconnected by edges, and the nodes may correspond to blocks of the model 118, and the edges may correspond to the signals of the model 118. In the initial IR 128, the blocks of the model 118 may be lowered to their corresponding core components, and nodes of the initial IR 128 may represent these core components.

In an embodiment, the one or more IRs, such as the initial IR 128, may be graph-based structures. For example, the IRs may be in the form of a hierarchical, Data Flow Graph (DFG), or in the form of a Parallel Intermediate Representation (PIR), which has a plurality of IR objects, including nodes interconnected by edges. The nodes of the PIR may represent core components that make up the blocks of the designated model 118 or portions thereof in an abstract manner. The edges of the PIR may represent the connections between the blocks of the model 118. Special nodes, called network instance components (NICs), provide hierarchy in the PIR, for example, by abstractly representing subsystems of the model 118. That is, each element of the model 118 may map to one or more nodes of the PIR, and each connecting line or arrow of the model 118 may map to one or more edges of the PIR.

The initial IR 128 may have a plurality of hierarchically arranged levels. More specifically, the initial IR 128 may be a top-level of the in-memory representation of the source model 118, and one or more of the components of the initial IR 128 may be a particular type or form of in-memory representation. For example, one or more nodes of the initial IR 128 may be a Control Flow Graph (CFG), Control Data Flow Graph (CDFG), program structure tree (PST), abstract syntax tree (AST), etc. A CDFG may capture the control flow as well as the data flow of a graphical model through data dependency and control dependency edges. The initial IR 128 may be saved to memory. Additionally or alternatively, one or more snap shots may be taken of the version of the IR to which one or more optimizations are applied.

The performance information mapper 326 may examine an IR, and annotate the nodes representing core components with performance data from the macro library 116. The performance information mapper 326 may use information to perform one or more lookups into the macro library 116 to obtain appropriate performance data for use in annotating the initial IR 128. The performance information mapper 326 may use the identity of the specified hardware synthesis tool chain and the identity of the specified type of target hardware element to select lookup tables or other data structures of the macro library 116 that store performance data for that hardware synthesis tool and type of target hardware element.

As mentioned, in some embodiments, performance data may be stored in the macro library 116 in terms of sparse lookup tables. If the identified sparse lookup table does not include a performance data value for a specified characteristic, such as bitwidth for the IR node of the core component being annotated, the performance information mapper 326 may use an interpolation or an extrapolation technique to obtain a performance data value for the specified characteristic, e.g., bitwidth. In an embodiment, the performance information mapper 326 may use a default interpolation or extrapolation technique, such a curve fitting or a step function technique. Alternatively, the performance information mapper 326 may apply a user-designated interpolation or extrapolation technique. That is, a user, having experience with the specified hardware synthesis tool chain and the specified target hardware element may choose an interpolation or extrapolation technique that more closely follows actual performance data for hardware elements synthesized by the hardware synthesis tool chain.

The process may be repeated by the performance information mapper 326 to annotate at least some if not all of the nodes of the initial IR 128 with performance data derived from the macro library 116. For IR nodes for which there is no performance data in macro library 116, the performance information mapper 326 may perform an analysis to estimate performance data. The analysis may include checking whether the node for which performance data is lacking is behaviorally similar to a core component for which performance data is available. That is, the performance information mapper 326 may look for a core component that represents a good match to the IR node for which performance data is not available. If a match is found, the performance information mapper 326 may utilize the performance data for the representative IR node. Core components representing buffers and shifts may be treated as combinational components with zero delays. If a behaviorally similar core component is not found, a pipeline analysis may be performed to determine if there are registers inside the component. If so, the component may be treated as a sequential component; otherwise as a combinational component with zero delays. With the nodes of the initial IR 128 annotated with performance data, the performance information mapper 326 may estimate the performance of a hardware implementation of the model 118. The estimated performance may be in a form that corresponds to the one or more constraints received by the code generator 300. In some embodiments, performance data may be added to a visual display of the model 118 for evaluation, e.g., by a user. For example, model elements may be annotated with performance data.

Timing

Suppose the one or more received constraints relate to timing. The optimization engine 304 may identify the critical path of the initial IR 128, which may present a bottleneck to achieving the timing set forth in the one or more constraints. The optimization engine 304 may use a form of static timing analysis to locate the critical path in the initial IR 128. The form of static timing analysis employed by the optimization engine 304 may be designed to account for one or more execution attributes of the modeling environment 102.

In some embodiments, the performance information mapper 326 may supplement the information obtained from the macro library 116. For example, estimates of routing delays may be included to improve the timing estimation. The estimates may be generated using heuristics. For example, the performance information mapper 326 may additionally impose a percentage of the logic delay on a core component to account for interconnect delay when the core component is connected to another core component. Estimates may also be provided for special patterns identified in the IR. For example, patterns corresponding to a multiply element feeding an adder element may have less delay as compared to the sum of the core component delays. The performance information mapper 326 may apply a predetermined factor for such combined delays.

The modeling environment 102 may support the creation of hierarchy in models. For example, as a model becomes more complex, a user may choose to represent a set of model elements by a single model element within the model. This single model element may be a subsystem block, a sub Virtual Instrument (SubVI), etc. Subsystem blocks may contain other subsystem blocks, thereby establishing hierarchical levels within the model. Once created by the user, a subsystem block may be saved in a library of the modeling environment 102 for re-use in other models. Similarly, a set of graphical state elements may be organized into a subchart.

A model may also include one or more partitions. For example, a first model, referred to as a parent model, may contain one or more other models, referred to as referenced models or sub-models. A referenced model may be a stand-alone model that is incorporated into the parent model. That is, a referenced model may be executed or simulated, code may be generated for a referenced model, etc. The referenced model may be represented by a single model elements, such as a model reference block, within the parent model. A referenced model may itself include one or more other referenced models.

In an embodiment, the optimization engine 304 may perform static timing analysis at each level of hierarchy of the model 118. For example, the optimization engine 304 may perform static timing analysis on each subsystem or on a subset of subsystems of the model 118. Where a subsystem appears multiple times in the model 118, the static timing analysis may be performed once, and re-used at each instance or occurrence of the subsystem in the model 118. The optimization engine 304 may compute a propagation delay at each IR node of a subsystem. For IR nodes representing combinational logic, the propagation delay may be the maximum propagation delay at the node's inputs plus the delay within the node itself. For IR nodes that represent registers, the propagation delay may be the delay within the IR node that represents a register. Information regarding the delay within IR nodes representing combinational logic and IR nodes representing registers may be obtained by the optimization engine 304 from the macro library 116. It should be understood that the optimization engine 304 may be configured with the identity of some IR nodes to be treated as register type nodes. For example, IR nodes that represent delay blocks of the model 118 may be considered register type nodes. In addition, one or more high-level model elements, if included in the macro library 116 may also include registers in them. For example, discrete-time integrator blocks, pipelined versions of trigonometric function blocks that use cordic algorithms, pipelined versions of Newton-Raphson filters or functions, etc. may include registers, and may thus be designated as register type nodes.

In an embodiment, the optimization engine 304 may compute the following path delays for each subsystem, to the extent they are present:

1.) for each input port to the subsystem, the longest path (in terms of latency) from that input to any register within the subsystem;

2.) the longest path between any two registers within the subsystem;

3.) for each output port, the longest path from any register within the subsystem to that output port; and 4.) for each input port to the subsystem, the longest path (in terms of latency) from that input to every output port of the subsystem.

For each subsystem, delays constituted from these four types of paths, are considered to be the performance data for the subsystem. This process may be repeated for each (non-duplicate) subsystem of the model 118.

The optimization engine 304 may mark output ports of IR nodes with propagation delays determined using static timing analysis. The optimization engine 304 may identify a path ending with an IR node having the largest propagation delay as a most critical path. The optimization engine 304 may locate each input port leading to this output port, and may identify the input port having the largest delay, e.g., propagation delay to the input port plus delay from the input port to the output port. The optimization engine 304 may then identify the output port of the component feeding this input port, locate the input port(s) leading to that output port, and identify the input port having the largest delay. This process may be repeated until the optimization engine 304 encounters a boundary component, such as a register or an input port. The optimization engine 304 may consider all of the nodes and ports visited in this process to be the critical path. If the optimization engine 304 encounters a subsystem, it may repeat the procedure for each pair of input and output ports for components on the critical path inside the subsystem.

In some embodiments, the modeling environment 102 may support the creation of multi-rate models, and the code generator 300 may generate code for multi-rate models. For example, a model created in the modeling system 102 may include model elements configured to execute at different sample rates. The code generator 300 may generate a single master clock using one or more counters that operate at the fastest sample rate defined in the model. The code generator 300 may also generate a timing controller that outputs clock enable signals running at rates that are an integer multiple slower than the master clock. These clock enable signals may be used to control the code generated for those portions of the model operating at slower sample rates. Alternatively, the code generator 300 may generate multiple primary clocks to control the code generated for those portions of the model operating at different rates.

Figure 11:
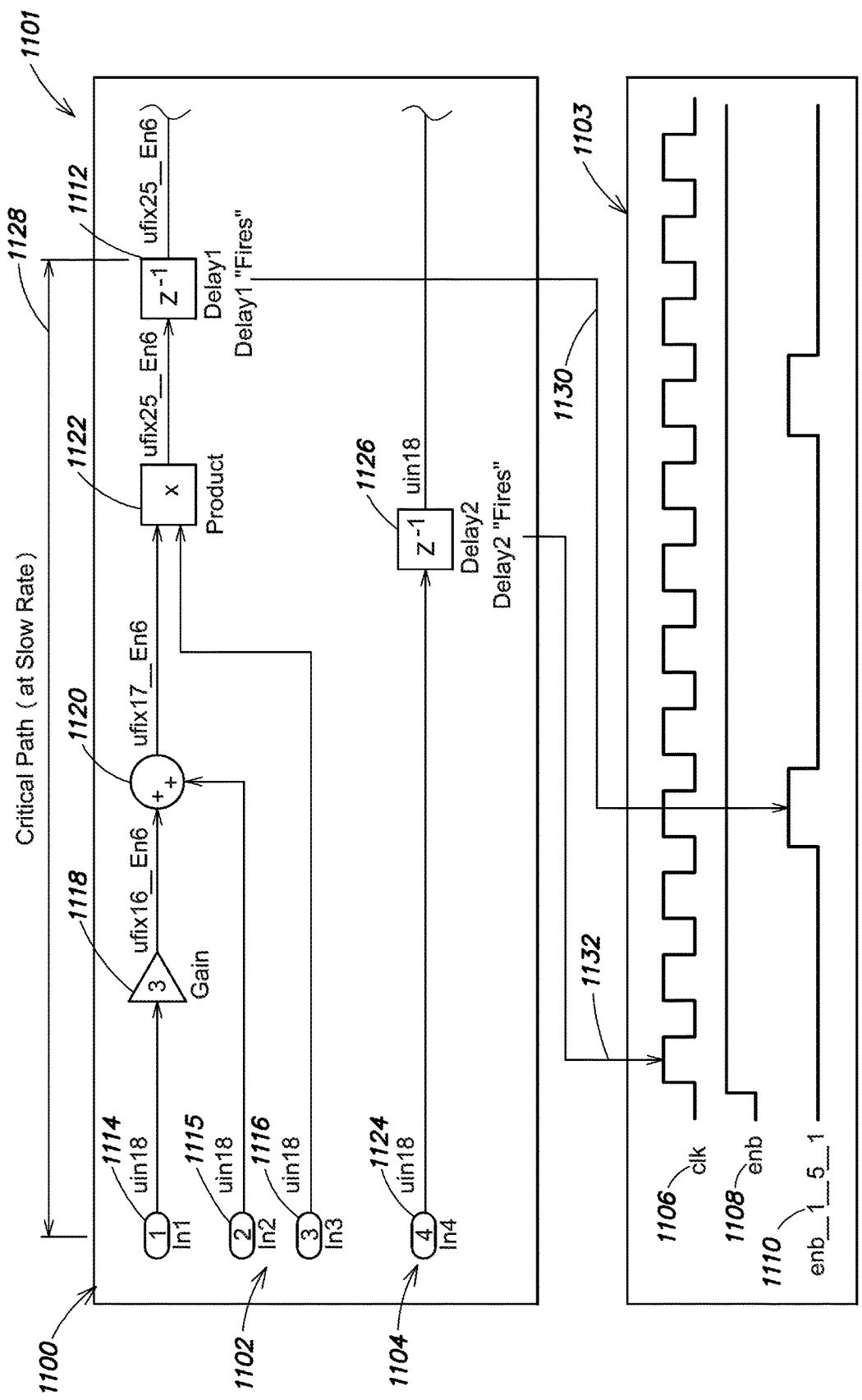
FIG. 11 is a schematic diagram illustrating a multirate model in accordance with an embodiment.

FIG. 11 is a schematic diagram 1101 of a portion of a model 1100 and a timing diagram 1103 for the portion of the model 1100. The model portion 1100 includes a first part 1102 and a second part 1104, each having a plurality of model elements. The first part 1102 includes first to third inport blocks 1114-1116, a gain block 1118, a sum block 1120, a product block 1122, and a delay block (labeled 'Delay1') 1112. The second part 1104 includes a first inport block 1124 and a delay block (labeled 'Delay2') 1126. The delay blocks 1112 and 1126 receive input signals and may be designed to delay outputting the received input signal by a specified delay length parameter. The first part 1102 of the model portion 1100 runs at a slower rate than the second portion 1104. More specifically, the first part 1102 is five times slower than the second part 1104.

The code generator 300 may generate a clock (clk) signal 1106, a first enable (enb) signal 1108, and a second enable (enb_1_5_1) signal 1110 when generating HDL code for the model 1100. The optimization engine 304, using static timing analysis, may initially determine that the critical path for the model 1100 is at the first portion 1102. However, the first portion 1102 is only enabled, e.g., only 'fires', once every five cycles, as compared to the second portion 1104. For example, the delay block 1112 of the first portion 1102 fires when the enb_1_5_1 enable signal 1110 is high, as indicated by first arrow 1130, whereas the delay block 1126 of the second portion fires when the clk signal 1106 is high, as indicated by second arrow 1132.

The IR generator 316 may include rate information in one or more of the IRs, such as the initial IR 128, and the optimization engine 304 may analyze this rate information to determine the critical path of the model 1100. For example, the optimization engine 304 may treat the path through a portion of a model running at a slower rate, such as the first portion 1102, as a multi-cycle path. For a multi-cycle path, the optimization engine 304 may relax the timing constraint. For example, if a destination register is found to be clocked at a slower rate, then the latency of the path that includes such a destination register may be divided by the ratio of the slower rate to the clock rate.

Referring to FIG. 11, the path through the first portion 1102 may be considered to be a five-cycle path. In addition, the propagation delay computed for the Delay1 block 1112, which may be considered to be a register, may be divided by five.

The optimization engine 304 may identify the critical path of the model as the path having the largest computed delay. The optimization engine 304 may designate the critical path, and the UI engine 110 may use a graphical affordance to show the critical path to a user. For example, the UI engine 110 may highlight the critical path with a color, e.g., red, on a visual representation of the model 118, e.g., on a display or other output device. The UI engine 110 may alternatively provide a graphical affordance, such as arrow (labeled 'Critical Path (at slow rate)') 1128 to the model 1100.

Nonetheless, it should be understood that the critical path may occur within a single model element of the model 118. That is, a model element representing one or more complex functions or operations may be comprises of a plurality of core components. A user of the modeling environment 102, however, may not have access to the plurality of core components that make up the model element. That is, the arrangement of core components, which make up the model element, may be masked from the user. Nonetheless, the optimization engine 304, which may operate on the IRs, has visibility into the block, and may thus identify a critical path that exists within a single model element of the modeling environment 102.

FIG. 7 is a schematic illustration of a subsystem 700. The subsystem 700 includes an Inport block 702, a Sum block 704, and an Outport block 706. The optimization engine 304 may determine that the critical path of a model that includes the subsystem 700 is within the Sum block itself 704. That is, the critical path may occur along a path of core components that comprise the Sum block 704. A user, however, may not have access to the core components of the Sum block. In other words, the core components of the Sum block 704 may be masked from the user.

FIG. 8 is a schematic illustration of a subsystem 800 that is the same as the subsystem 700, except that the Sum block 704 has been lowered to its core components, which are designated generally 802. The optimization 304, which may analyze the initial IR 128, may identify a critical path within the core components 802 that make up a more complex block, such as the Sum block 704.

Area

If the one or more received constraints relate to area, the optimization engine 304 may compute an area usage for the model 118 as implemented in the specified target hardware element. For example, the optimization engine 304 may sum the area data for each node of the initial IR 128 as obtained from the macro library 116.

Power

If the one or more received constraints relate to power, the optimization engine 304 may compute a power usage for the model 118 as implemented in the specified target hardware element. For example, the optimization engine 304 may sum the power data for each node of the IR as obtained from the macro library 116.

The power consumed by the target hardware element 108 may come from two sources: static power and dynamic power. Static power consumption is caused by transistor leakage current whether the hardware device is running or idle. Dynamic power consumption refers to the power consumed when a signal transition occurs at gate outputs. The synthesis report produced by the synthesis tool may include information from which static power data for core components may be determined, and this static power data may be included in the macro library 116. The optimization engine 304 may instrument the model 118 and simulate it to estimate dynamic power, e.g., by determining how data changes on the model's signals, and combine this with static power data from the macro library 116.

Constraints/Termination Criteria

Next, the optimization engine 304 may determine automatically whether the one or more constraints specified for the hardware implementation of the model 118 are satisfied. If the one or more constraints are not satisfied, the optimization engine 304 may determine whether a termination criterion is met. In an embodiment, the termination criterion may represent a methodology for proving that a better solution, e.g., in terms of timing, area, or power, than the current solution cannot be achieved. That is, the optimization engine 304 may proceed to optimize the source model 118 until a best frequency or a best area is achieved. If the critical path is found to be within a core component of the source model 118, the best frequency criterion may be considered to be met. Exemplary methodologies include the use of greedy algorithms and hill climbing algorithms, and the optimization engine 304 may apply a greedy or hill climbing algorithm during the iterative process to determine when the best solution has been reached.

If the termination criterion is not met, the selector 328 of the optimization engine 304 may automatically select one or more optimization techniques from the storage unit 312 for application to an IR for the model 118. In some embodiments, the selector 328 may apply one or more heuristics to choose the optimization to be applied. The optimization engine 204 may modify the initial IR 128 according to the selected optimization technique.

For example, suppose the constraint concerns timing. The selector 328 may select an optimization technique that increases the speed or timing of a hardware implementation of a model, such as pipelining and/or adding registers and performing retiming, which may reduce clock period. The optimization engine 304 may modify the initial IR 128 by incorporating pipelining and/or register additions into the critical path(s) of the initial IR 128. The optimization engine 304 may modify the initial IR 128 by running a variation of the retiming algorithm on a representation of the initial IR 128 with propagation delays marked for each node in the initial IR 128. The revised initial IR may be provided to the graphical model generator 310, which may produce a visual representation of a revised model from the revised initial IR, and the UI engine 110 may present the revised model to the user, e.g., on a display.

To the extent pipelining and/or register additions were incorporated into the revised IR, these new nodes may have corresponding model elements in the revised model, such as new blocks, which may be represented in a visual display of the revised model. For example, new delay blocks may be included in the revised model indicating the addition of registers. The user may examine the revised model to observe the changes made by the optimization engine 304 in an effort to satisfy the one or more constraints.

If the constraint concerns area, the selector 328 may select an optimization technique for reducing area. The optimization technique may call for replacing nodes of the IR with other versions of the nodes that, when implemented in hardware, use less area. More specifically, for a given model element, such as an Adder block, there may be more than one possible in-memory representation. A first in-memory representation, such as a first set of nodes, may be optimized for speed, while a second in-memory representation, such as a second set of nodes, may be optimized for area. When the constraint seeks to minimize area, the selector 328 may select the in-memory representation optimized for area, e.g., the second set of nodes. Alternatively, the selector 328 may select a first optimization technique in which hardware resources, such as Adders, Multipliers, etc. are shared, or a second optimization technique in which vector paths are reduced to smaller vectors or scalars. If register usage exceeds a threshold, the optimization engine 204 may select a technique in which data is mapped to block RAMs rather than registers.

Similarly, if the constraint concerns power, the selector 328 may select an optimization technique that reduces power consumption. For example, a third in-memory representation of the given model element may be optimized for power consumption. The optimization technique may call for replacing nodes of the IR with a third in-memory representation, e.g., a third set of nodes, that, when implemented in hardware, use less power than the first and second in-memory representations of the given model element. For example, nodes representing a multiplier targeting a lookup table on an FPGA may be replaced with nodes representing dedicated multiplier hardware, which may consume less power than the lookup table implementation.

It should be understood that other optimization techniques may be available and/or selected. As noted, the optimization techniques may be designed for application to the IR.

The optimization engine 304 may thus automatically generate a revised IR that tries to optimize the identified bottleneck preventing the one or more constraints from being satisfied. The optimization performed by the optimization engine 204 may be saved. For example, the optimization engine 204 may save information regarding the selected optimization technique as well as the revised initial IR and/or the revised model. In some embodiments, the optimization engine 304 applies the optimization technique to the IR, which represents a high-level abstraction of the design, rather than a low-level representation of the design, such as a Register Transfer Level (RTL) description.

The now revised initial IR may be annotated with performance data from the macro library 116, and a performance analysis of the revised initial IR may be performed. The optimization engine 304 may again determine whether the one or more constraints are now satisfied following the generation of a revised initial IR, and whether a termination criterion has been met. So long as the one or more constraints are not satisfied and the termination criterion is not met, the process may iterate through the loop in which an IR is annotated with performance data, and determinations are made whether the estimated performance meets the one or more constraints or the termination criterion is met. For example, an optimization may be performed by inserting registers/pipelines in the critical path to break a long combinational path, and by applying retiming to adjust the position of a register.

If the optimization engine 304 determines that the one or more constraints, such as timing, area, or power constraints, are satisfied, then the automated optimization loop ends, and the report generator 306 may generate an optimization report. The final version of the IR may be used to emit the HDL code 324. The generated HDL 324 may be output by the code generator 300, and processing by the code generator 300 may be complete. If the one or more constraints are not satisfied, but the termination criterion has been met, then the automated optimization loop again ends and an optimization report is generated and HDL code may be generated.

In order to generate the HDL code 324, the IR generator 316 may then perform a series of transforms starting with the initial IR 128 and producing the plurality of transitional IRs 320 until the final IR 322 is produced. The particular transforms that are applied may start on the initial IR 128 and produce the final IR 322 in a form that is suitable for HDL code generation. That is, the final IR 226 is in a form and structure that renders it suitable for emitting the HDL code 324.

The generated HDL code 324, which is optimized to satisfy the one or more received constraints (if achievable) may be provided by the modeling environment 102 to the hardware synthesis tool chain 104 using the communication interface 106. The hardware synthesis tool chain 102 may synthesize the target hardware element 108 based on the generated HDL code 324 received from the modeling environment 102.

In addition, the output of the optimization process may be a guidance file that describes the changes that should be made to the source model 118 to achieve the desired optimization. In particular, the report generator 306 may collect the changes made to the initial IR 128 to satisfy the constraint, and may describe these changes in a user understandable form in the guidance file. For example, the changes may be described in terms of model editing instructions. The report generator 208 may then output the guidance file, e.g., to a display or a printer. A user may examine the guidance file and choose to implement the recommendations by making the suggested changes to the source model 118 manually. In some embodiments, the guidance file may include information, such as achieved performance, at different iterations of the optimization process. A user may choose to implement the changes corresponding to one of the intermediary iterations rather than the changes corresponding to the final optimization. Furthermore, the user may decide to make some, but not all of the suggested changes and/or to make other changes to the source model 118.

As described, once the training tool 200 has populated the macro library 116 for a given hardware synthesis tool and a type of target hardware element, the modeling environment 102, through the code generation and optimization engine 300, may estimate hardware implementation performance for a model, and automatically optimize that hardware implementation performance without having to again interface with the hardware synthesis tool. Once the optimization process has settled on an optimized model version, HDL code may be generated for that optimized model version and passed to the hardware synthesis tool so that target hardware may be synthesized to perform the procedures or algorithms of the optimized model version. By taking the hardware synthesis tool out of the loop, the optimization process may be performed quickly from within the modeling environment 102. Nonetheless, by using the hardware synthesis tool to generate the performance data stored in the macro library, accurate performance estimates may be generated by the modeling environment 102 during the optimization process. The process, moreover, may be fully automated, e.g., it may be automatically performed by the training tool 200 and the code generator 300. The process may be used to characterize the design space in terms of conflicting objectives regarding timing, area and power. That is, the optimization process may be repeated for the same source model using different performance constraints, and the resulting optimized model designs and/or generated HDL code may be evaluated, e.g., by a user of the system 100.

Figure 4A:
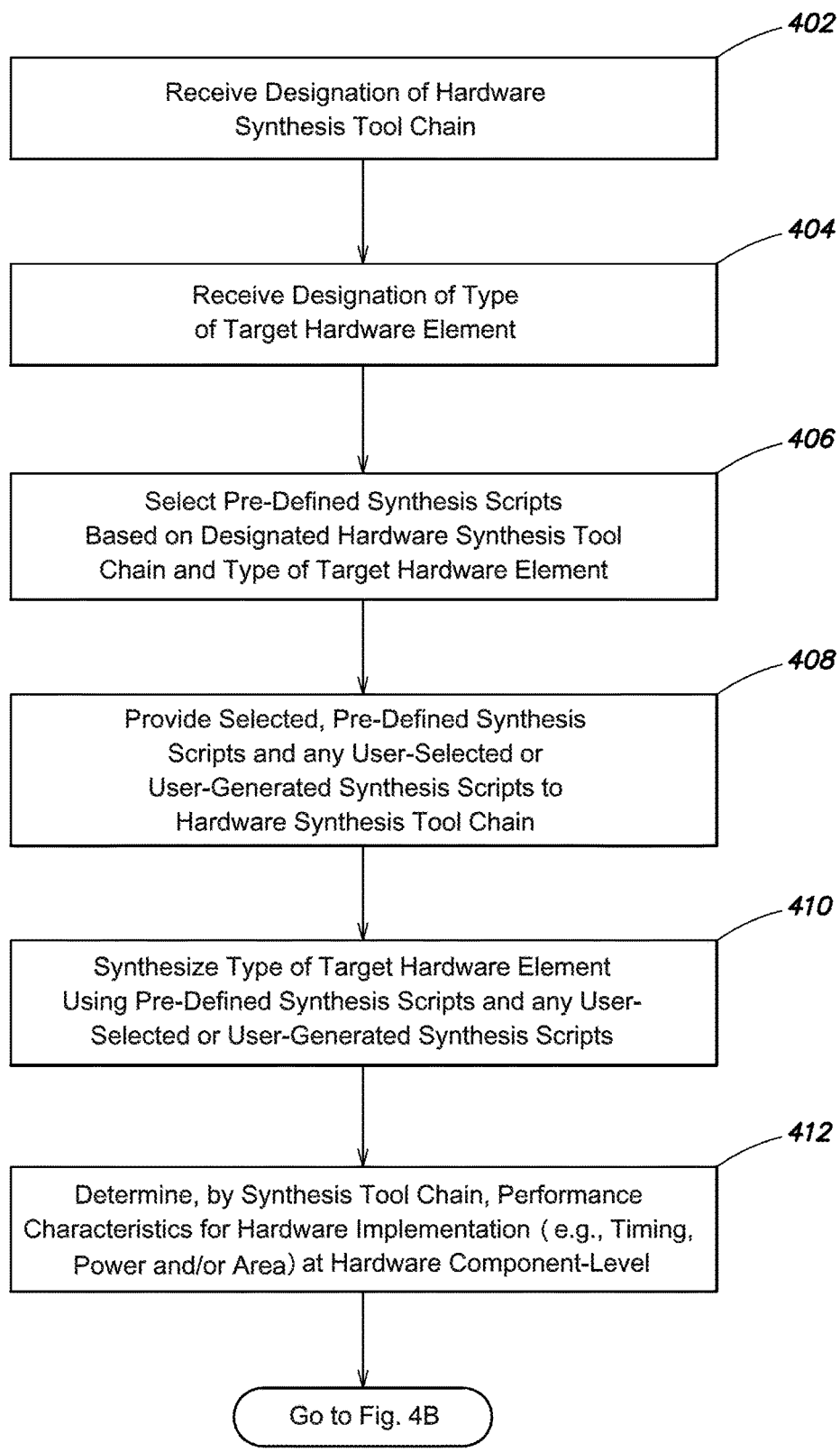
FIGS. 4A-B are partial views of a flow diagram of a method in accordance with an embodiment.
Figure 4B:
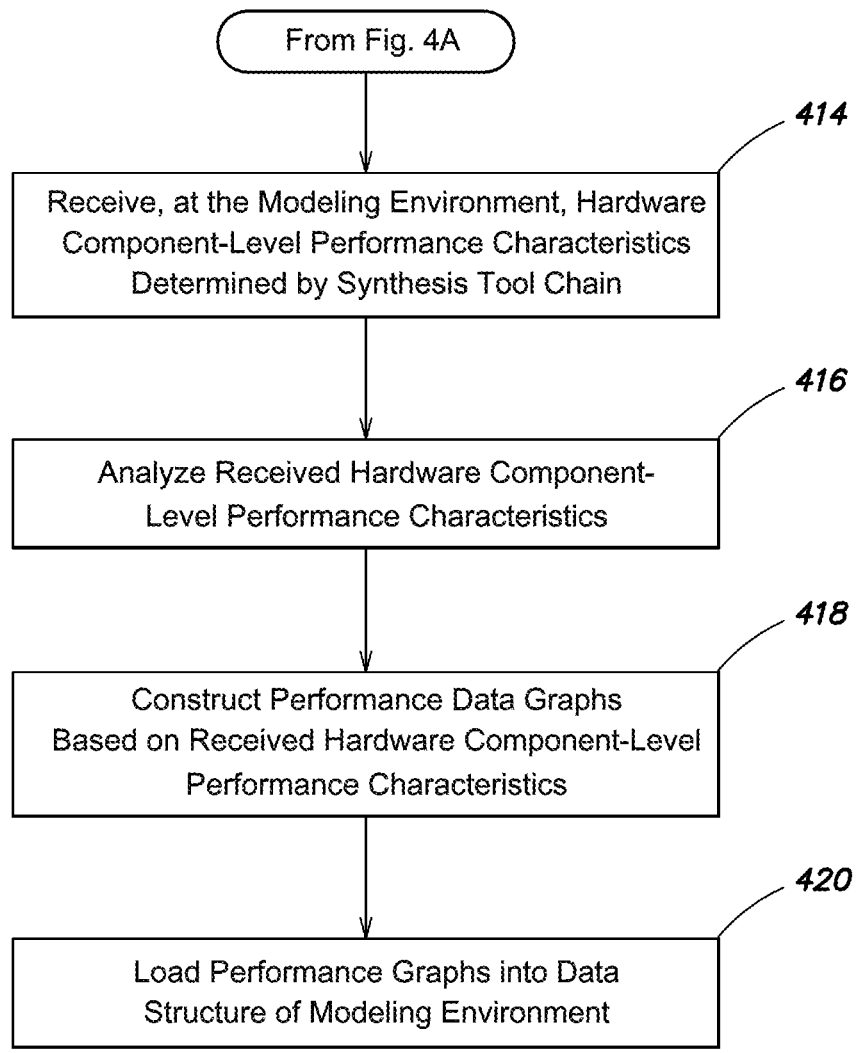

FIGS. 4A-B are partial views of a flow diagram of a method for creating the macro library 116 in accordance with an embodiment. The hardware implementation training tool 200 may receive a designation of a particular hardware synthesis tool chain, as indicated at step 402. The hardware implementation training tool 200 also may receive a designation of a particular type of target hardware element, as indicated at step 404. The selector 202 may perform a search of the storage unit 208, and identify one or more scripts to be used in the creation of the macro library 116 for the hardware synthesis tool chain and the target hardware element that were identified to the hardware implementation training tool 200, as indicated at step 406. The pre-defined scripts identified by the selector 202 as well as any custom-scripts created and/or identified by the user may be provided by the modeling environment 102 to the hardware synthesis tool chain 104, as indicated at step 408.

The hardware synthesis tool chain may run the pre-defined and custom scripts received from the hardware implementation training tool 200, causing the tool to synthesize hardware components for the core components specified in the scripts, as indicated at step 410. The performance analyzer 138 may determine the utilization and performance of the hardware implementation of the scripts, as indicated at step 412. For example, area utilization metrics may be LUTs, RAMs, DSPs, etc. The hardware implementation training tool 200 may access the synthesis report generated by the synthesis tool chain, as indicated at step 414 (FIG. 4B). The performance data analysis and abstraction engine 206 may analyze the performance data derived from the synthesis report, as indicated at step 416. Specifically, the performance data analysis and abstraction engine 206 may construct one or more performance data graphs from the received performance data, as indicated at step 418, and may load these graphs in the macro library 116, as indicated at step 420.

Figure 6A:
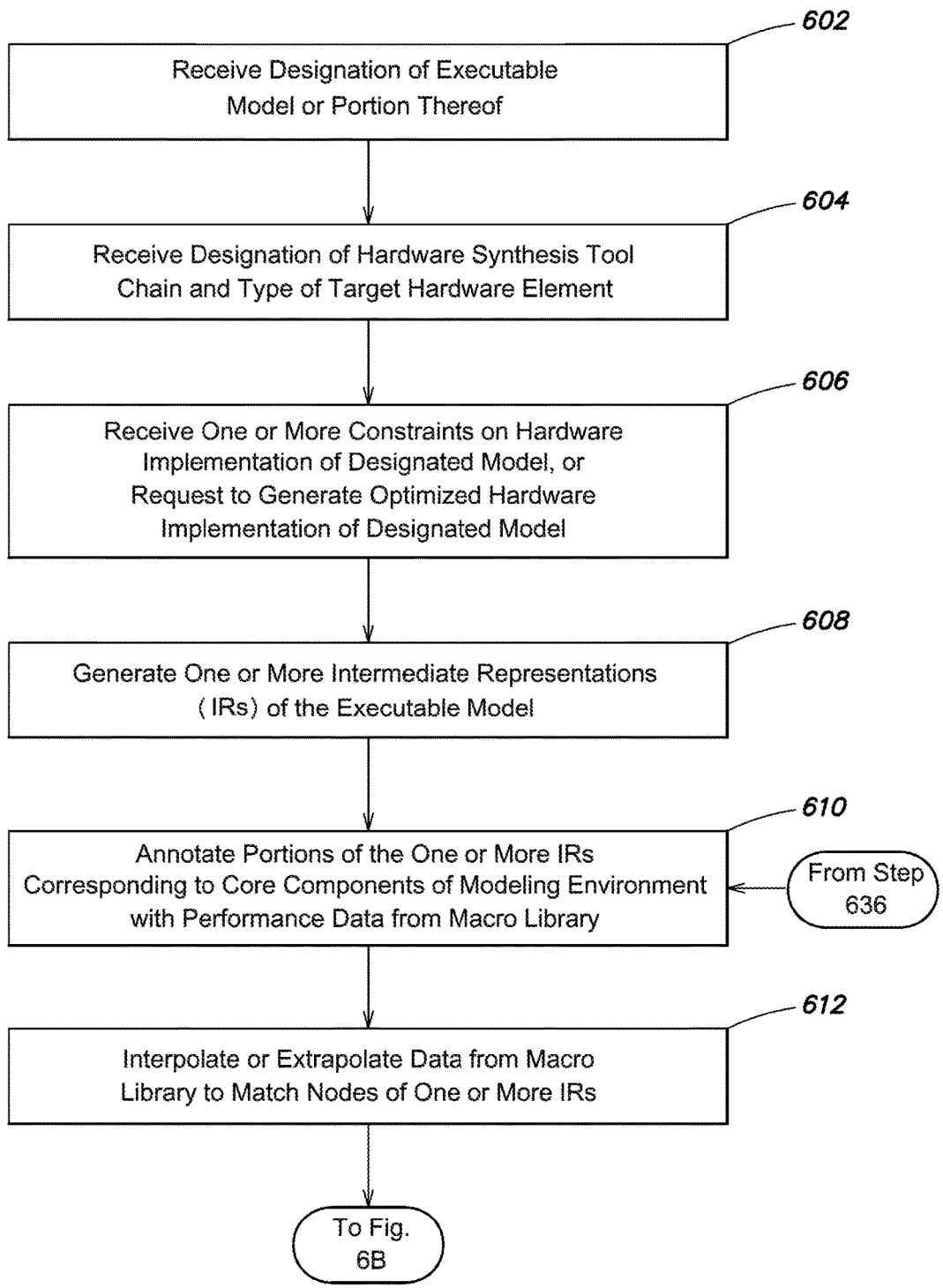
FIGS. 6A-C are partial views of a flow diagram of a method in accordance with an embodiment.
Figure 6B:
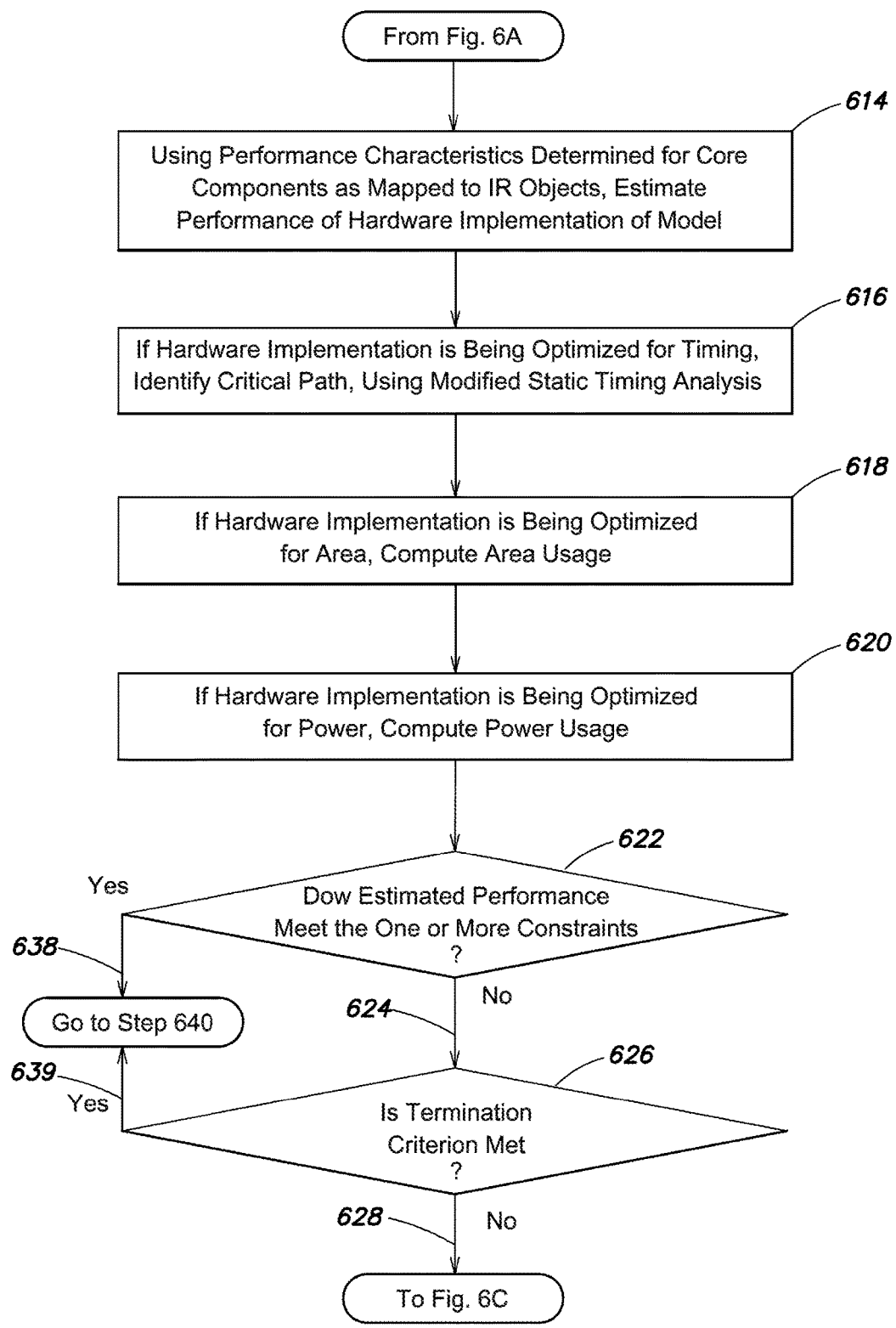
Figure 6C:
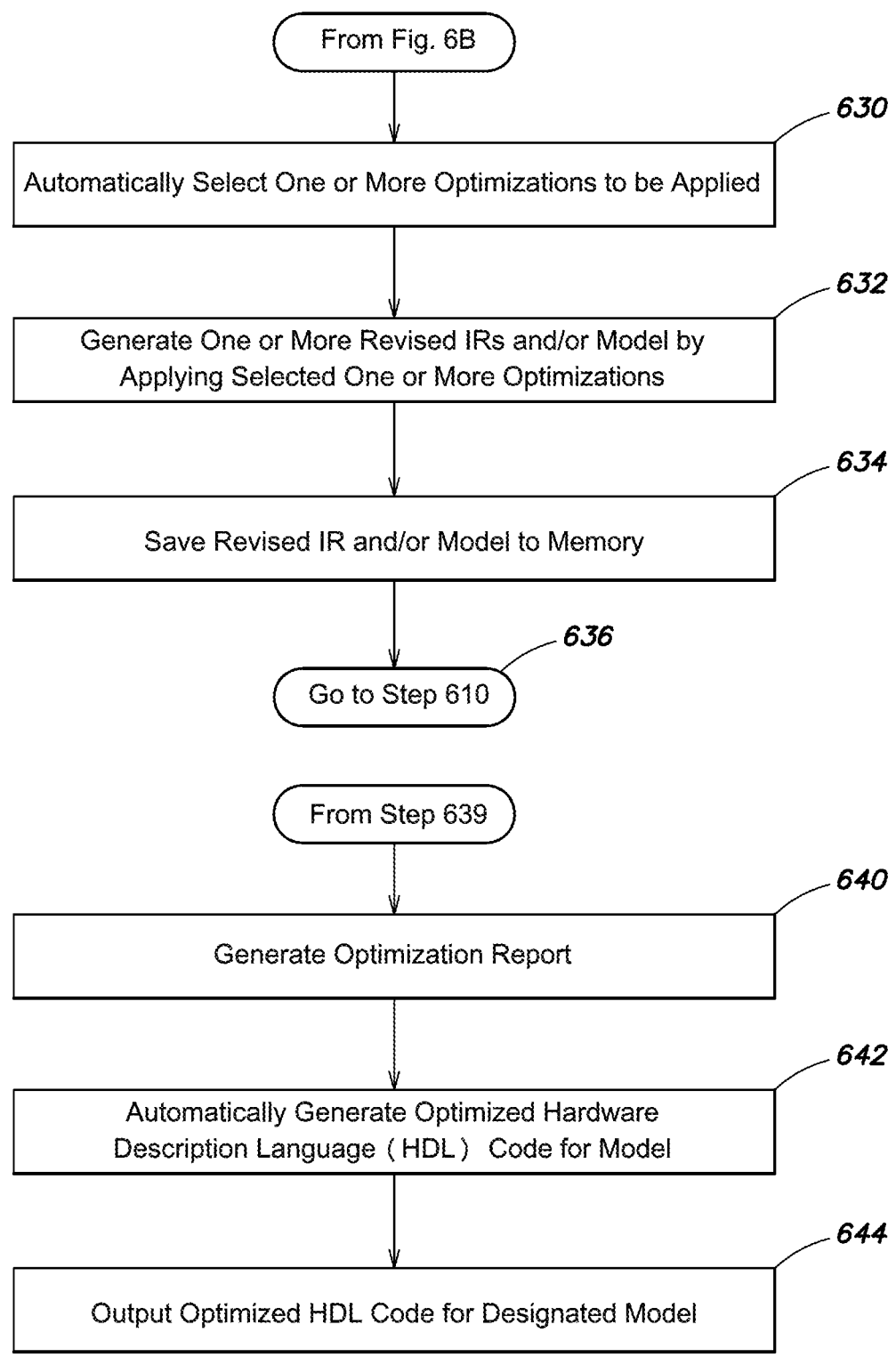

FIGS. 6A-6C are partial views of a flow diagram of a method for generating optimized HDL code from a model in accordance with an embodiment. An executable model, such as the model 118 or a portion thereof, may be received by or identified to the code generator 300, as indicated at step 602. The code generator 300 also may receive a designation of a type of synthesis tool chain to be used to implement the designated model in hardware, and a designation of the type of target hardware element, as indicated at step 604. The code generator 300 also may receive one or more constraints on a hardware implementation of the model or a request to generate an optimized hardware implementation, as indicated at step 606. The IR generator 314 may generate one or more in-memory representations, such as Intermediate Representations (IRs), of the source model 118, as indicated at step 608. The performance information mapper 326 may examine an IR, and annotate the nodes representing core components with performance data from the macro library 116, as indicated at step 610. If an identified sparse lookup table does not include a performance data value for a specified characteristic, such as bitwidth, dimensions, etc., for the IR node of the core component being annotated, the performance information mapper 326 may use an interpolation or an extrapolation technique to obtain a performance data value for the specified bitwidth, as indicated at step 612.

With the nodes of the initial IR annotated with performance data, the performance information mapper 326 may estimate the performance of a hardware implementation of the model 118, as indicated at step 614 (FIG. 6B). The optimization engine 304 may identify the critical path of the initial IR 128, which may present a bottleneck to achieving the timing set forth in the one or more constraints, as indicated at step 616. If the one or more received constraints relate to area, the optimization engine 304 may compute an area usage for the model 118 as implemented in the specified target hardware element, as indicated at step 618. If the one or more received constraints relate to power, the optimization engine 304 may compute a power usage for the model 118 as implemented in the specified target hardware element, as indicated at step 620. The optimization engine 304 may determine automatically whether the one or more constraints specified for the hardware implementation of the model 118 are satisfied, as indicated at decision block 622. If the one or more constraints are not satisfied, the optimization engine 304 may determine whether a termination criterion is met, as indicated by No arrow 624 leading to decision block 626.

If the termination criterion is not met, the selector 328 of the optimization engine 304 may automatically select one or more optimization techniques from the storage unit 312 for application to the initial IR for the model 118, as indicated by No arrow 628 leading to step 630 (FIG. 6C). The optimization engine 204 may modify the initial IR according to the selected optimization technique, as indicated at step 632. The optimization performed by the optimization engine 204 may be saved, as indicated at step 634. Processing may then return to step 610 (FIG. 6A), as indicated by step 636, and the now revised initial IR may be annotated with performance data from the macro library 116, and a performance analysis of the revised initial IR may be performed. The optimization engine 304 may again determine whether the one or more constraints are now satisfied following the generation of a revised initial IR, as indicated by the decision step 622, and whether a termination criterion has been met, as indicated by the decision step 626. So long as the one or more constraints are not satisfied and the termination criterion is not met, the process may iterate through the loop represented by steps 610 to 634.

If the optimization engine 304 determines that the one or more constraints, such as timing, area, or power constraints, are satisfied, then the automated optimization loop may end, and the report generator 306 may generate an optimization report, as indicated by Yes arrow 638 (FIG. 6B), leading through step 639 to step 640. The final version of the initial IR may be used to generate the HDL code 324, as indicated at step 642. The generated HDL 324 may be output by the code generator 300, as indicated at step 644, and processing by the code generator 300 may be complete. If the one or more constraints are not satisfied, but the termination criterion has been met, then the automated optimization loop again may end, and an optimization report and HDL code may be generated, as indicated by Yes arrow 646 leading to step 639.

Embedded System

Figure 9:
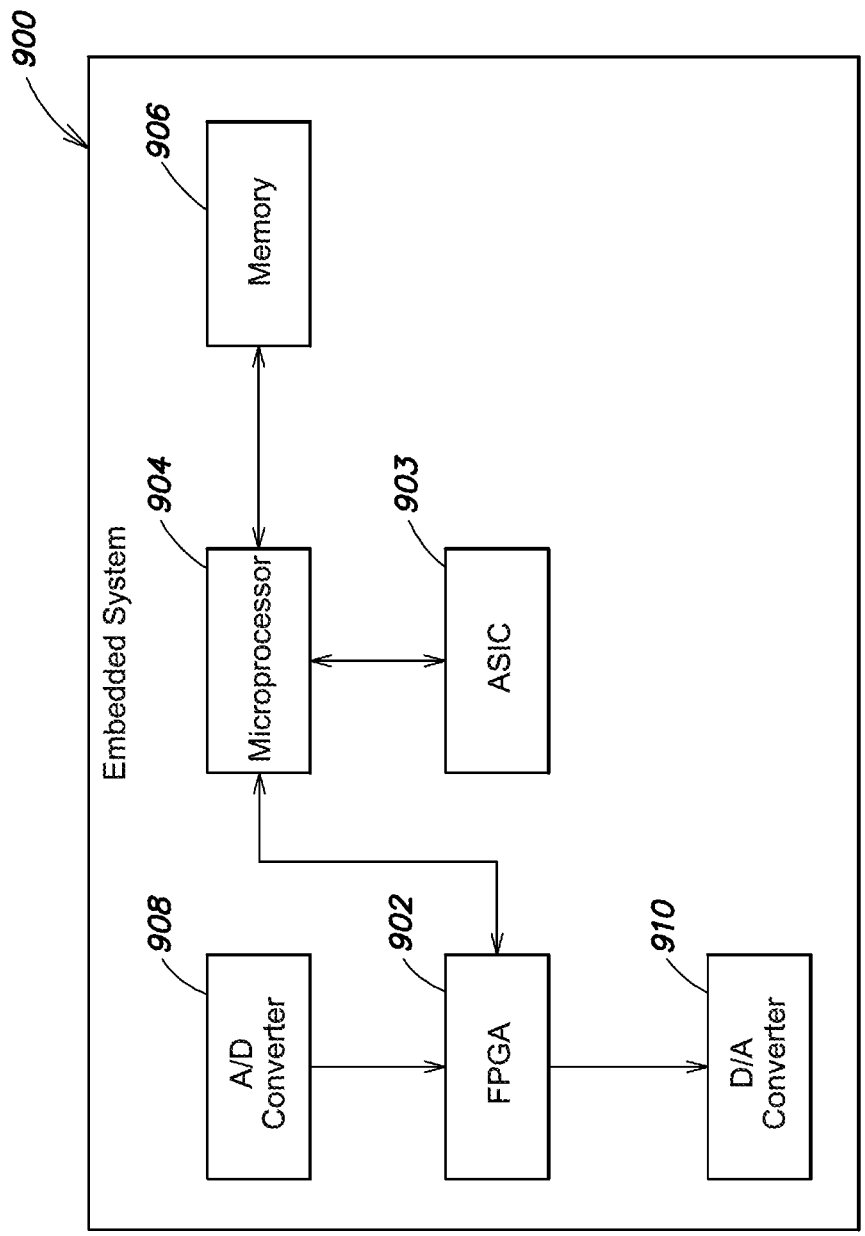
FIG. 9 is a schematic diagram illustrating an embedded system in accordance with an embodiment.

FIG. 9 is a schematic illustration of an embedded system 900. The embedded system 900 may include one or more target hardware elements, such as an FPGA 902 and an ASIC 903. The embedded system 900 also may include a microprocessor 904, such as a Digital Signal Processor (DSP), and a memory 906. The embedded system 900 may also include one or more analog components, such as an Analog-to-Digital (A/D) converter 908, and a Digital-to-Analog (D/A) converter 910. The embedded system 900 of FIG. 9 is intended for illustrative purposes only, and the present invention may be used with other embedded system designs. For example, the embedded system 900 may include a general purpose processor in addition to or in place of the microprocessor 904. In addition, the embedded system 900 may include additional components, fewer components, or different components than those shown in FIG. 9. For example, the embedded system 900 may further include input ports, output ports, and one or more busses that interconnect the various components. Moreover, the embedded system 900 may include components arranged in configurations that differ from the configuration of FIG. 9.

An executable model, such as a graphical block diagram, may be created by a user that includes one or more first portions to be run on the FPGA 902, one or more second portions to be run on the ASIC 903, and one or more third portions to be run by the microprocessor 1204. For example, the user may partition the model and assign different partitions to different hardware components, such as the FPGA 902 and the ASIC 903.

The FPGA 902 and the ASIC 903 may be configured using the automated optimization process of the present invention. For example, the synthesis tool 104 may be used to configure the FPGA 902 and the ASIC 903 from final versions of generated HDL.

Illustrative Data Processing System

Figure 10:
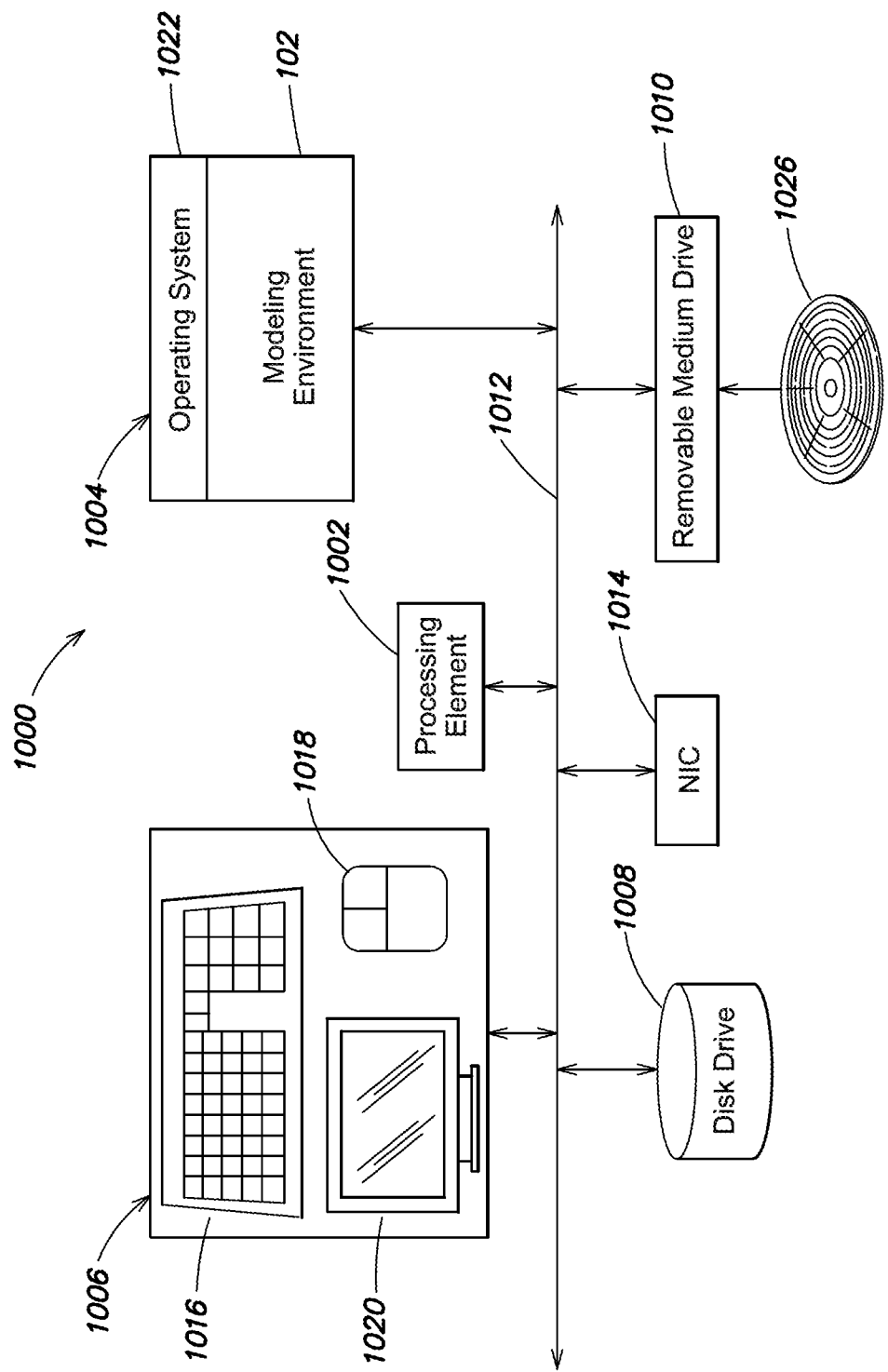
FIG. 10 is a schematic diagram of a data processing device in accordance with an embodiment of the invention.

FIG. 10 is a schematic illustration of a computer or data processing system 1000 for implementing an embodiment of the invention. The computer system 1000 may include one or more processing elements, such as a processing element 1002, a main memory 1004, user input/output (I/O) 1006, a persistent data storage unit, such as a disk drive 1008, and a removable medium drive 1010 that are interconnected by a system bus 1012. The computer system 1000 may also include a communication unit, such as a network interface card (NIC) 1014. The user I/O 1006 may include a keyboard 1016, a pointing device, such as a mouse 1018, and a display 1020. Other user I/O 1006 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1004, which may be a Random Access Memory (RAM), may store a plurality of program libraries or modules, such as an operating system 1022, and one or more application programs that interface to the operating system 1022, such as the modeling environment 100.

The removable medium drive 1010 may accept and read a computer readable medium 1026, such as a CD, DVD, floppy disk, solid state drive, tape, flash memory or other non-transitory medium. The removable medium drive 1010 may also write to the computer readable medium 1026.

Suitable computer systems include personal computers (PCs), workstations, servers, laptops, tablets, palm computers, smart phones, electronic readers, and other portable computing devices, etc. Nonetheless, those skilled in the art will understand that the computer system 1000 of FIG. 10 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 102 may be hosted on a server, and accessed by a remote client through an application hosting system, such as the Remote Desktop Connection tool from Microsoft Corp.

Suitable operating systems 1022 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1022 may provide services or functions for other modules, such as allocating memory, organizing data according to a file system, prioritizing requests, etc. The operating system 1022 may run on a virtual machine, which may be provided by the data processing system 1000.

As indicated above, a user or developer, such as an engineer, scientist, programmer, etc., may utilize one or more input devices, such as the keyboard 1016, the mouse 1018, and the display 1020 to operate the modeling environment 102, and construct one or more models, such as graphical models having executable semantics. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in addition to or instead of executable graphical models, the invention may be used with graphical models having executable semantics, such as models created using Architecture Analysis and Design Language (AADL), Uniform Modeling Language (UML), and/or SysML tools. In addition, the generated code may include fixed-point code to run on a fixed-point processor, or code to emulate fixed-point behavior on a floating-point processor. Therefore, it is the object of the appended claims to cover all such variations and modifications as come within the true spirit and scope of the invention.

What is claimed is:

1. A method comprising:
  storing, in a first memory, a plurality of hardware synthesis scripts, where the plurality of hardware synthesis scripts
    include instructions directing a hardware synthesis tool chain to implement functionality of core components of a modeling environment using hardware components of one or more physical target hardware elements, the core components providing base level functions or operations for use in executable models created in or run by the modeling environment, one or more of the core components implemented as model elements of the modeling environment;

providing the plurality of hardware synthesis scripts to the hardware synthesis tool chain for synthesizing the hardware components to implement the functionality of the core components of the modeling environment;

receiving performance data from the hardware synthesis tool chain for the hardware components synthesized to implement the functionality of the core components;

mapping, by a first processor coupled to the first memory, the performance data received from the hardware synthesis tool chain to the core components of the modeling environment;

storing, in the first memory or a second memory, the performance data as mapped to the core components of the modeling environment;

utilizing, by the first processor or a second processor, the performance data as mapped to the core components during generation of code for at least a portion of a given executable model that includes a plurality of the core components; and implementing a given physical target hardware element based on the code generated for the at least a portion of the given executable model.

2. The method of claim 1 where the plurality of hardware synthesis scripts further specify characteristics for hardware implementations of the core components of the modeling environment.

3. The method of claim 2 where the characteristics are at least one of:
bitwidths,
fan-in values,
fan-out values,
number of inputs, or
core component parameters.

4. The method of claim 1 where the performance data as mapped to the core components is stored as one or more lookup tables.

5. The method of claim 1 where at least some of the plurality of synthesis scripts are custom-created by a user.

6. The method of claim 1 where the plurality of synthesis scripts are written in a Tool Command Language (tcl).

7. The method of claim 1 further comprising:
abstracting the performance data received from the hardware synthesis tool chain; and
storing the abstracted performance data in one or more data structures.

8. The method of claim 7 where the one or more data structures include sparse lookup tables (LUTs).

9. The method of claim 8 further comprising:
applying an interpolation algorithm or an extrapolation algorithm to derive particular performance data from the sparse LUTs.

10. The method of claim 1 further comprising:
a. receiving the given executable model, the given executable model including a plurality of the model elements;
b. generating an intermediate representation (IR) of the given executable model, the IR stored in the first memory, the second memory, or a third memory, the IR having a plurality of nodes associated with the core components that form the plurality of the model elements of the given executable model;
c. annotating the plurality of nodes of the IR with at least a portion of the performance data from the hardware synthesis tool chain;
d. estimating a hardware performance for the IR based on the performance data annotated to the plurality nodes of the IR;
e. automatically selecting an optimization technique;
f. applying the selected optimization technique to the IR to generate a revised IR having a plurality of nodes; and
g. repeating steps c to f using the revised IR, wherein the optimization technique is at least one of:
improving timing through pipelining or retiming,
improving area usage by replacing a first set of the plurality of nodes of the IR that implement functionality of a first model element with replacement nodes that implement the functionality of the first model element with less area than the first set of the plurality of nodes, or
improving power consumption by replacing a second set of the plurality of nodes of the IR that implement functionality of a second model element with substitute nodes that implement the functionality of the second model element with less power than the second set of the plurality of nodes.

11. The method of claim 10 where the repeating steps c to f is performed until
the estimated hardware performance satisfies a specified constraint, or
a termination criterion is met.

12. The method of claim 11 where the specified constraint is a timing constraint of a hardware implementation of the given executable model, and the estimating includes:
identifying a critical path, and
determining a latency of the critical path.

13. The method of claim 11 where the specified constraint is a timing constraint of a hardware implementation of the given executable model, and the estimating includes:
identifying a signal of the given executable model that operates at a slower rate than a clock speed associated with the given executable model;
identifying a register on a path of the given executable model that includes the signal that operates at the slower rate; and
determining a final latency for the path of the given executable model by dividing an initial latency by a ratio of the slower rate to the clock speed.

14. The method of claim 10 where the given executable model includes a plurality of occurrences of a subsystem, the method further comprising:
determining a latency for a first occurrence of the subsystem; and
applying the determined latency to the other occurrences of the subsystem.

15. The method of claim 1 wherein the performance data is for at least one of timing, area, or power.

16. The method of claim 1 wherein a first script of the plurality of hardware synthesis scripts specifies a constraint on at least one of timing, area, or power, and is free of identifying particular hardware components.

17. The method of claim 1 wherein the hardware components include at least one of:
logic cells;
input/output (I/O) cells;
hardware lookup tables; or
standard cells of an ASIC technology library.

18. One or more non-transitory computer-readable media comprising program instructions for execution by one or more processors, the program instructions instructing the one or more processors to:
store, in a first memory coupled to at least one of the one or more processors, a plurality of hardware synthesis scripts, where the plurality of hardware synthesis scripts include instructions directing a hardware synthesis tool chain to implement functionality of core components of a modeling environment using hardware components of one or more physical target hardware elements, the core components providing base level functions or operations for use in executable models created in or run by the modeling environment, one or more of the core components implemented as model elements of the modeling environment;

provide the plurality of hardware synthesis scripts to the hardware synthesis tool chain for synthesizing the hardware components to implement the functionality of the core components of the modeling environment;

receive performance data for the hardware components of the one or more physical target hardware elements from the hardware synthesis tool chain;

map the performance data received from the hardware synthesis tool chain to the core components of the modeling environment;

store, in the first memory or a second memory, the performance data as mapped to the core components of the modeling environment;

utilize the performance data as mapped to the core components during generation of code for at least a portion of a given executable model that includes a plurality of the core components; and implement a given physical target hardware element based on the code generated for the at least a portion of the given executable model.

19. The one or more non-transitory computer-readable media of claim 18 where the plurality of hardware synthesis scripts further specify characteristics for hardware implementations of the core components of the modeling environment.

20. The one or more non-transitory computer-readable media of claim 18 where the performance data as mapped to the core components is stored as one or more lookup tables.

21. The one or more non-transitory computer-readable media of claim 18 wherein the program instruction further include instructions to:
  abstract the performance data received from the hardware synthesis tool chain;
  store the abstracted performance data in one or more data structures; and
  apply an interpolation algorithm or an extrapolation algorithm to derive particular performance data from the one or more data structures.

22. The one or more non-transitory computer-readable media of claim 18 where the performance data is for at least one of timing, area, or power.

23. The one or more non-transitory computer-readable media of claim 18 wherein the program instructions further include instructions to:
  abstract the performance data received from the hardware synthesis tool chain; and
  store the abstracted performance data in one or more sparse lookup tables (LUTs) structures.

24. The one or more non-transitory computer-readable media of claim 23 wherein the program instructions further include instructions to:
  apply an interpolation algorithm or an extrapolation algorithm to derive particular performance data from the sparse LUTs.

25. The one or more non-transitory computer-readable media of claim 18 wherein a first script of the plurality of hardware synthesis scripts specifies a constraint on at least one of timing, area, or power, and is free of identifying particular hardware components.

26. The one or more non-transitory computer-readable media of claim 18 wherein the hardware components include at least one of:
  logic cells;
  input/output (I/O) cells;
  hardware lookup tables; or
  standard cells of an ASIC technology library.

27. An apparatus comprising:
  a memory storing a plurality of hardware synthesis scripts, where the plurality of hardware synthesis scripts
    include instructions directing a hardware synthesis tool chain to implement functionality of core components of a modeling environment using hardware components of one or more physical target hardware elements, the core components providing base level functions or operations for use in executable models created in or run by the modeling environment, one or more of the core components implemented as model elements of the modeling environment; and
  one or more processors at least one of which is coupled to the memory, the one or more processors configured to:
    provide the plurality of hardware synthesis scripts to the hardware synthesis tool chain for synthesizing the hardware components to implement the functionality of the core components of the modeling environment;
    receive performance data from the hardware synthesis tool chain for the hardware components synthesized to implement the functionality of the core components;
    map the performance data received from the hardware synthesis tool chain to the core components of the modeling environment;
    store, in the memory or in an additional memory, the performance data as mapped to the core components of the modeling environment;
    utilize the performance data as mapped to the core components during generation of code for at least a portion of a given executable model that includes a plurality of the core components; and
    implement a given physical target hardware element based on the code generated for the at least a portion of the given executable model.

28. The apparatus of claim 27 wherein the plurality of hardware synthesis scripts further specify characteristics for hardware implementations of the core components of the modeling environment, and the characteristics are at least one of:
  bitwidths,
  fan-in values,
  fan-out values,
  number of inputs, or
  core component parameters.

29. The apparatus of claim 27 wherein the performance data as mapped to the core components is stored as one or more lookup tables.

30. The apparatus of claim 29 wherein the one or more processors is further configured to:
  abstract the performance data received from the hardware synthesis tool chain; and
  store the abstracted performance data in one or more data structures.

31. The apparatus of claim 30 wherein the one or more data structures include sparse lookup tables (LUTs).

32. The apparatus of claim 31 wherein the one or more processors is further configured to:
apply an interpolation algorithm or an extrapolation algorithm to derive particular performance data from the sparse LUTs.

33. The apparatus of claim 27 wherein the performance data is for at least one of timing, area, or power.

34. The apparatus of claim 27 wherein a first script of the plurality of hardware synthesis scripts specifies a constraint on at least one of timing, area, or power, and is free of identifying particular hardware components.

35. The apparatus of claim 27 wherein the hardware components include at least one of:
 logic cells;
 input/output (I/O) cells;
 hardware lookup tables; or
 standard cells of an ASIC technology library.

* * * * *